United States Patent
Baudot et al.

(10) Patent No.: US 11,151,355 B2
(45) Date of Patent: Oct. 19, 2021

(54) GENERATION OF AN ESTIMATED FINGERPRINT

(71) Applicant: InvenSense, Inc., San Jose, CA (US)

(72) Inventors: Jonathan Baudot, Grenoble (FR); Etienne De Foras, Saint Nazaire les Eymes (FR)

(73) Assignee: InvenSense, Inc., San Jose, CA (US)

( * ) Notice: Subject to any disclaimer, the term of this patent is extended or adjusted under 35 U.S.C. 154(b) by 0 days.

(21) Appl. No.: 16/236,107

(22) Filed: Dec. 28, 2018

(65) Prior Publication Data

US 2019/0228206 A1 Jul. 25, 2019

Related U.S. Application Data

(60) Provisional application No. 62/621,511, filed on Jan. 24, 2018.

(51) Int. Cl.
*G06K 9/00* (2006.01)
*H04N 5/232* (2006.01)

(52) U.S. Cl.
CPC ........... *G06K 9/0008* (2013.01); *G06K 9/001* (2013.01); *G06K 9/0004* (2013.01); *G06K 9/00026* (2013.01); *G06K 9/00926* (2013.01); *H04N 5/23229* (2013.01)

(58) Field of Classification Search
CPC ............ G06K 9/0008; G06K 9/00026; G06K 9/00033; G06K 9/00093; G06K 9/0002; G06K 9/0004; G06K 9/001; G06K 9/00926; H04N 5/23229
USPC ........................................ 382/124, 125, 115
See application file for complete search history.

(56) References Cited

U.S. PATENT DOCUMENTS

| | | |
|---|---|---|
| 4,880,012 A | 11/1989 | Sato |
| 5,575,286 A | 11/1996 | Weng et al. |
| 5,684,243 A | 11/1997 | Gururaja et al. |
| 5,808,967 A | 9/1998 | Yu et al. |
| 5,867,302 A | 2/1999 | Fleming |
| 5,911,692 A | 6/1999 | Hussain et al. |
| 6,071,239 A | 6/2000 | Cribbs et al. |
| 6,104,673 A | 8/2000 | Cole et al. |
| 6,289,112 B1 | 9/2001 | Jain et al. |

(Continued)

FOREIGN PATENT DOCUMENTS

| | | |
|---|---|---|
| CN | 1826631 A | 8/2006 |
| CN | 102159334 A | 8/2011 |

(Continued)

OTHER PUBLICATIONS

Tang, et al., "Pulse-Echo Ultrasonic Fingerprint Sensor on a Chip", IEEE Transducers, Anchorage, Alaska, USA, Jun. 21-25, 2015, pp. 674-677.

(Continued)

*Primary Examiner* — Abdul-Samad A Adediran

(57) ABSTRACT

In a method for generating an estimated fingerprint image, a ridge/valley pattern of a fingerprint of a finger is received. A sensor image including a partial fingerprint of the finger is received. Ridge/valley characteristics of the fingerprint are extracted from the sensor image including the partial fingerprint. An estimated fingerprint image is generated based at least on the ridge/valley pattern of the fingerprint and the ridge/valley characteristics of the fingerprint.

20 Claims, 8 Drawing Sheets

(56) References Cited

U.S. PATENT DOCUMENTS

| | | |
|---|---|---|
| 6,292,576 B1 | 9/2001 | Brownlee |
| 6,350,652 B1 | 2/2002 | Libera et al. |
| 6,428,477 B1 | 8/2002 | Mason |
| 6,483,932 B1 | 11/2002 | Martinez et al. |
| 6,500,120 B1 | 12/2002 | Anthony |
| 6,676,602 B1 | 1/2004 | Barnes et al. |
| 6,736,779 B1 | 5/2004 | Sano et al. |
| 7,067,962 B2 | 6/2006 | Scott |
| 7,109,642 B2 | 9/2006 | Scott |
| 7,243,547 B2 | 7/2007 | Cobianu et al. |
| 7,257,241 B2 | 8/2007 | Lo |
| 7,400,750 B2 | 7/2008 | Nam |
| 7,433,034 B1 | 10/2008 | Huang |
| 7,459,836 B2 | 12/2008 | Scott |
| 7,471,034 B2 | 12/2008 | Schlote-Holubek et al. |
| 7,489,066 B2 | 2/2009 | Scott et al. |
| 7,634,117 B2 | 12/2009 | Cho |
| 7,739,912 B2 | 6/2010 | Schneider et al. |
| 8,018,010 B2 | 9/2011 | Tigli et al. |
| 8,139,827 B2 | 3/2012 | Schneider et al. |
| 8,255,698 B2 | 8/2012 | Li et al. |
| 8,311,514 B2 | 11/2012 | Bandyopadhyay et al. |
| 8,335,356 B2 | 12/2012 | Schmitt |
| 8,433,110 B2 | 4/2013 | Kropp et al. |
| 8,508,103 B2 | 8/2013 | Schmitt et al. |
| 8,515,135 B2 | 8/2013 | Clarke et al. |
| 8,666,126 B2 | 3/2014 | Lee et al. |
| 8,703,040 B2 | 4/2014 | Liufu et al. |
| 8,723,399 B2 | 5/2014 | Sammoura et al. |
| 8,805,031 B2 | 8/2014 | Schmitt |
| 9,056,082 B2 | 6/2015 | Liautaud et al. |
| 9,070,861 B2 | 6/2015 | Bibl et al. |
| 9,224,030 B2 | 12/2015 | Du et al. |
| 9,245,165 B2 | 1/2016 | Slaby et al. |
| 9,424,456 B1 | 8/2016 | Kamath Koteshwara et al. |
| 9,572,549 B2 | 2/2017 | Belevich et al. |
| 9,582,102 B2 | 2/2017 | Setlak |
| 9,582,705 B2 | 2/2017 | Du et al. |
| 9,607,203 B1 | 3/2017 | Yazdandoost et al. |
| 9,607,206 B2 | 3/2017 | Schmitt et al. |
| 9,613,246 B1 | 4/2017 | Gozzini et al. |
| 9,665,763 B2 | 5/2017 | Du et al. |
| 9,747,488 B2 | 8/2017 | Yazdandoost et al. |
| 9,785,819 B1 | 10/2017 | Oreifej |
| 9,815,087 B2 | 11/2017 | Ganti et al. |
| 9,817,108 B2 | 11/2017 | Kuo et al. |
| 9,818,020 B2 | 11/2017 | Schuckers et al. |
| 9,881,195 B2 | 1/2018 | Lee et al. |
| 9,881,198 B2 | 1/2018 | Lee et al. |
| 9,898,640 B2 | 2/2018 | Ghavanini |
| 9,904,836 B2 | 2/2018 | Yeke Yazdandoost et al. |
| 9,909,225 B2 | 3/2018 | Lee et al. |
| 9,922,235 B2 | 3/2018 | Cho et al. |
| 9,934,371 B2 | 4/2018 | Hong et al. |
| 9,939,972 B2 | 4/2018 | Shepelev et al. |
| 9,953,205 B1 | 4/2018 | Rasmussen et al. |
| 9,959,444 B2 | 5/2018 | Young et al. |
| 9,967,100 B2 | 5/2018 | Hong et al. |
| 9,983,656 B2 | 5/2018 | Merrell et al. |
| 9,984,271 B1 | 5/2018 | King et al. |
| 10,275,638 B1 | 4/2019 | Yousefpor et al. |
| 10,315,222 B2 | 6/2019 | Salvia et al. |
| 10,322,929 B2 | 6/2019 | Soundara Pandian et al. |
| 10,387,704 B2 | 8/2019 | Dagan et al. |
| 10,461,124 B2 | 10/2019 | Berger et al. |
| 10,478,858 B2 | 11/2019 | Lasiter et al. |
| 10,497,747 B2 | 12/2019 | Tsai et al. |
| 10,515,255 B2 | 12/2019 | Strohmann et al. |
| 10,539,539 B2 | 1/2020 | Garlepp et al. |
| 10,600,403 B2 | 3/2020 | Garlepp et al. |
| 10,656,255 B2 | 5/2020 | Ng et al. |
| 10,670,716 B2 | 6/2020 | Apte et al. |
| 10,706,835 B2 | 7/2020 | Garlepp et al. |
| 10,755,067 B2 | 8/2020 | De Foras et al. |
| 2002/0135273 A1 | 9/2002 | Mauchamp et al. |
| 2003/0013955 A1 | 1/2003 | Poland |
| 2004/0085858 A1 | 5/2004 | Khuri-Yakub et al. |
| 2004/0122316 A1 | 6/2004 | Satoh et al. |
| 2004/0174773 A1 | 9/2004 | Thomenius et al. |
| 2005/0023937 A1 | 2/2005 | Sashida et al. |
| 2005/0057284 A1 | 3/2005 | Wodnicki |
| 2005/0100200 A1* | 5/2005 | Abiko ............... G06K 9/00026 382/124 |
| 2005/0110071 A1 | 5/2005 | Ema et al. |
| 2005/0146240 A1 | 7/2005 | Smith et al. |
| 2005/0148132 A1 | 7/2005 | Wodnicki et al. |
| 2005/0162040 A1 | 7/2005 | Robert |
| 2006/0052697 A1 | 3/2006 | Hossack et al. |
| 2006/0079777 A1 | 4/2006 | Karasawa |
| 2006/0230605 A1 | 10/2006 | Schlote-Holubek et al. |
| 2006/0280346 A1 | 12/2006 | Machida |
| 2007/0046396 A1 | 3/2007 | Huang |
| 2007/0047785 A1* | 3/2007 | Jang ................... G06K 9/0008 382/125 |
| 2007/0073135 A1 | 3/2007 | Lee et al. |
| 2007/0202252 A1 | 8/2007 | Sasaki |
| 2007/0215964 A1 | 9/2007 | Khuri-Yakub et al. |
| 2007/0223791 A1 | 9/2007 | Shinzaki |
| 2007/0230754 A1 | 10/2007 | Jain et al. |
| 2008/0125660 A1 | 5/2008 | Yao et al. |
| 2008/0150032 A1 | 6/2008 | Tanaka |
| 2008/0194053 A1 | 8/2008 | Huang |
| 2009/0005684 A1 | 1/2009 | Kristoffersen et al. |
| 2009/0182237 A1 | 7/2009 | Angelsen et al. |
| 2009/0232367 A1 | 9/2009 | Shinzaki |
| 2009/0274343 A1 | 11/2009 | Clarke |
| 2009/0303838 A1 | 12/2009 | Svet |
| 2010/0030076 A1 | 2/2010 | Vortman et al. |
| 2010/0046810 A1* | 2/2010 | Yamada ............ G06K 9/00026 382/124 |
| 2010/0113952 A1 | 5/2010 | Raguin et al. |
| 2010/0168583 A1 | 7/2010 | Dausch et al. |
| 2010/0195851 A1 | 8/2010 | Buccafusca |
| 2010/0201222 A1 | 8/2010 | Adachi et al. |
| 2010/0202254 A1 | 8/2010 | Roest et al. |
| 2010/0239751 A1 | 9/2010 | Regniere |
| 2010/0251824 A1 | 10/2010 | Schneider et al. |
| 2010/0256498 A1 | 10/2010 | Tanaka |
| 2010/0278008 A1 | 11/2010 | Ammar |
| 2011/0285244 A1 | 11/2011 | Lewis et al. |
| 2011/0291207 A1 | 12/2011 | Martin et al. |
| 2012/0016604 A1 | 1/2012 | Irving et al. |
| 2012/0092026 A1 | 4/2012 | Liautaud et al. |
| 2012/0095347 A1 | 4/2012 | Adam et al. |
| 2012/0147698 A1 | 6/2012 | Wong et al. |
| 2012/0224041 A1 | 9/2012 | Monden |
| 2012/0232396 A1 | 9/2012 | Tanabe |
| 2012/0238876 A1 | 9/2012 | Tanabe et al. |
| 2012/0263355 A1 | 10/2012 | Monden |
| 2012/0279865 A1 | 11/2012 | Regniere et al. |
| 2012/0288641 A1 | 11/2012 | Diatezua et al. |
| 2012/0300988 A1* | 11/2012 | Ivanov ................ G06K 9/0002 382/115 |
| 2013/0051179 A1 | 2/2013 | Hong |
| 2013/0064043 A1 | 3/2013 | Degertekin et al. |
| 2013/0127592 A1 | 5/2013 | Fyke et al. |
| 2013/0133428 A1 | 5/2013 | Lee et al. |
| 2013/0201134 A1 | 8/2013 | Schneider et al. |
| 2013/0271628 A1 | 10/2013 | Ku et al. |
| 2013/0294201 A1 | 11/2013 | Hajati |
| 2013/0294202 A1 | 11/2013 | Hajati |
| 2014/0060196 A1 | 3/2014 | Falter et al. |
| 2014/0117812 A1 | 5/2014 | Hajati |
| 2014/0176332 A1 | 6/2014 | Alameh et al. |
| 2014/0208853 A1 | 7/2014 | Onishi et al. |
| 2014/0219521 A1 | 8/2014 | Schmitt et al. |
| 2014/0232241 A1 | 8/2014 | Hajati |
| 2014/0265721 A1 | 9/2014 | Robinson et al. |
| 2014/0294262 A1 | 10/2014 | Schuckers et al. |
| 2014/0313007 A1 | 10/2014 | Harding |
| 2014/0355387 A1 | 12/2014 | Kitchens et al. |
| 2015/0036065 A1 | 2/2015 | Yousefpor et al. |
| 2015/0049590 A1 | 2/2015 | Rowe et al. |
| 2015/0087991 A1 | 3/2015 | Chen et al. |

(56) References Cited

U.S. PATENT DOCUMENTS

| | | |
|---|---|---|
| 2015/0097468 A1 | 4/2015 | Hajati et al. |
| 2015/0145374 A1 | 5/2015 | Xu et al. |
| 2015/0164473 A1 | 6/2015 | Kim et al. |
| 2015/0165479 A1 | 6/2015 | Lasiter et al. |
| 2015/0169136 A1 | 6/2015 | Ganti et al. |
| 2015/0189136 A1 | 7/2015 | Chung et al. |
| 2015/0198699 A1 | 7/2015 | Kuo et al. |
| 2015/0206738 A1 | 7/2015 | Rastegar |
| 2015/0213180 A1 | 7/2015 | Herberholz |
| 2015/0220767 A1 | 8/2015 | Yoon et al. |
| 2015/0241393 A1 | 8/2015 | Ganti et al. |
| 2015/0261261 A1 | 9/2015 | Bhagavatula et al. |
| 2015/0286312 A1 | 10/2015 | Kang et al. |
| 2015/0301653 A1 | 10/2015 | Urushi |
| 2015/0345987 A1 | 12/2015 | Hajati |
| 2015/0371398 A1 | 12/2015 | Qiao et al. |
| 2016/0051225 A1 | 2/2016 | Kim et al. |
| 2016/0063294 A1 | 3/2016 | Du et al. |
| 2016/0063300 A1 | 3/2016 | Du et al. |
| 2016/0070967 A1 | 3/2016 | Du et al. |
| 2016/0070968 A1 | 3/2016 | Gu et al. |
| 2016/0086010 A1 | 3/2016 | Merrell et al. |
| 2016/0092715 A1 | 3/2016 | Yazdandoost et al. |
| 2016/0092716 A1 | 3/2016 | Yazdandoost et al. |
| 2016/0100822 A1 | 4/2016 | Kim et al. |
| 2016/0107194 A1 | 4/2016 | Panchawagh et al. |
| 2016/0180142 A1* | 6/2016 | Riddle ............... G06K 9/00033 382/124 |
| 2016/0326477 A1 | 11/2016 | Fernandez-Alcon et al. |
| 2016/0350573 A1 | 12/2016 | Kitchens et al. |
| 2016/0358003 A1 | 12/2016 | Shen et al. |
| 2017/0004352 A1 | 1/2017 | Jonsson et al. |
| 2017/0330552 A1 | 1/2017 | Garlepp et al. |
| 2017/0032485 A1 | 2/2017 | Vemury |
| 2017/0075700 A1 | 3/2017 | Abudi et al. |
| 2017/0100091 A1 | 4/2017 | Eigil et al. |
| 2017/0110504 A1 | 4/2017 | Panchawagh et al. |
| 2017/0119343 A1 | 5/2017 | Pintoffl |
| 2017/0124374 A1 | 5/2017 | Rowe et al. |
| 2017/0168543 A1 | 6/2017 | Dai et al. |
| 2017/0185821 A1* | 6/2017 | Chen .................. G06K 9/00093 |
| 2017/0194934 A1 | 7/2017 | Shelton et al. |
| 2017/0200054 A1 | 7/2017 | Du et al. |
| 2017/0219536 A1 | 8/2017 | Koch et al. |
| 2017/0231534 A1 | 8/2017 | Agassy et al. |
| 2017/0255338 A1 | 9/2017 | Medina et al. |
| 2017/0293791 A1 | 10/2017 | Mainguet et al. |
| 2017/0316243 A1 | 11/2017 | Ghavanini |
| 2017/0316248 A1 | 11/2017 | He et al. |
| 2017/0322290 A1 | 11/2017 | Ng |
| 2017/0322291 A1 | 11/2017 | Salvia et al. |
| 2017/0322292 A1 | 11/2017 | Salvia et al. |
| 2017/0322305 A1 | 11/2017 | Apte et al. |
| 2017/0323133 A1 | 11/2017 | Tsai |
| 2017/0325081 A1 | 11/2017 | Chrisikos et al. |
| 2017/0326590 A1 | 11/2017 | Daneman |
| 2017/0326591 A1 | 11/2017 | Apte et al. |
| 2017/0326593 A1 | 11/2017 | Garlepp et al. |
| 2017/0326594 A1 | 11/2017 | Berger et al. |
| 2017/0328866 A1 | 11/2017 | Apte et al. |
| 2017/0328870 A1 | 11/2017 | Garlepp et al. |
| 2017/0330012 A1 | 11/2017 | Salvia et al. |
| 2017/0330553 A1 | 11/2017 | Garlepp et al. |
| 2017/0357839 A1 | 12/2017 | Yazdandoost et al. |
| 2018/0025202 A1 | 1/2018 | Ryshtun et al. |
| 2018/0032788 A1 | 2/2018 | Krenzer et al. |
| 2018/0101711 A1 | 4/2018 | D'Souza et al. |
| 2018/0107852 A1 | 4/2018 | Fenrich et al. |
| 2018/0107854 A1 | 4/2018 | Tsai et al. |
| 2018/0129849 A1 | 5/2018 | Strohmann et al. |
| 2018/0129857 A1 | 5/2018 | Bonev |
| 2018/0178251 A1 | 6/2018 | Foncellino et al. |
| 2018/0206820 A1 | 7/2018 | Anand et al. |
| 2018/0225495 A1 | 8/2018 | Jonsson et al. |
| 2018/0229267 A1 | 8/2018 | Ono et al. |
| 2018/0276443 A1 | 9/2018 | Strohmann et al. |
| 2018/0329560 A1 | 11/2018 | Kim et al. |
| 2018/0349663 A1 | 12/2018 | Garlepp et al. |
| 2018/0357457 A1 | 12/2018 | Rasmussen et al. |
| 2018/0369866 A1 | 12/2018 | Sammoura et al. |
| 2018/0373913 A1 | 12/2018 | Panchawagh et al. |
| 2019/0005300 A1 | 1/2019 | Garlepp et al. |
| 2019/0012673 A1 | 1/2019 | Chakraborty et al. |
| 2019/0018123 A1 | 1/2019 | Narasimha-Iyer et al. |
| 2019/0057267 A1 | 2/2019 | Kitchens et al. |
| 2019/0073507 A1 | 3/2019 | D'Souza et al. |
| 2019/0087632 A1 | 3/2019 | Raguin et al. |
| 2019/0102046 A1 | 4/2019 | Miranto et al. |
| 2019/0130083 A1 | 5/2019 | Agassy et al. |
| 2019/0171858 A1 | 6/2019 | Ataya et al. |
| 2019/0188441 A1 | 6/2019 | Hall et al. |
| 2019/0188442 A1 | 6/2019 | Flament et al. |
| 2019/0325185 A1 | 10/2019 | Tang |
| 2019/0340455 A1 | 11/2019 | Jung et al. |
| 2019/0370518 A1 | 12/2019 | Maor et al. |
| 2020/0030850 A1 | 1/2020 | Apte et al. |
| 2020/0050820 A1 | 2/2020 | Iatsun et al. |
| 2020/0050828 A1 | 2/2020 | Li et al. |
| 2020/0074135 A1 | 3/2020 | Garlepp et al. |
| 2020/0125710 A1 | 4/2020 | Andersson et al. |
| 2020/0147644 A1 | 5/2020 | Chang |
| 2020/0175143 A1 | 6/2020 | Lee et al. |
| 2020/0210666 A1 | 7/2020 | Flament |
| 2020/0285882 A1 | 9/2020 | Skovgaard Christensen et al. |
| 2020/0302140 A1 | 9/2020 | Lu et al. |

FOREIGN PATENT DOCUMENTS

| | | |
|---|---|---|
| CN | 105264542 A | 1/2016 |
| CN | 105378756 A | 3/2016 |
| CN | 109255323 A | 1/2019 |
| EP | 1214909 A1 | 6/2002 |
| EP | 2884301 A1 | 6/2015 |
| EP | 3086261 A2 | 10/2016 |
| JP | 2011004467 A | 2/2011 |
| TW | 201531701 A | 8/2015 |
| WO | 2009096576 A2 | 8/2009 |
| WO | 2009137106 A2 | 11/2009 |
| WO | 2014035564 A1 | 3/2014 |
| WO | 2015009635 A1 | 1/2015 |
| WO | 2015112453 A1 | 7/2015 |
| WO | 2015120132 A1 | 8/2015 |
| WO | 2015131083 A1 | 9/2015 |
| WO | 2015134816 A1 | 9/2015 |
| WO | 2015183945 A1 | 12/2015 |
| WO | 2016007250 A1 | 1/2016 |
| WO | 2016011172 A1 | 1/2016 |
| WO | 2016040333 A2 | 3/2016 |
| WO | 2016061406 A1 | 4/2016 |
| WO | 2016061410 A1 | 4/2016 |
| WO | 2017003848 A1 | 1/2017 |
| WO | 2017053877 A2 | 3/2017 |
| WO | 2017192895 A1 | 11/2017 |
| WO | 2017196678 A1 | 11/2017 |
| WO | 2017196682 A1 | 11/2017 |
| WO | 2017192903 A3 | 12/2017 |
| WO | 2019164721 A1 | 8/2019 |

OTHER PUBLICATIONS

ISA/EP, International Search Report and Written Opinion for International Application No. PCT/US2017/031120, 12 pages, dated Aug. 29, 2017 (Aug. 29, 2017).

ISA/EP, International Search Report and Written Opinion for International Application No. PCT/US2017/031120, 13 pages, dated Sep. 1, 2017 (Sep. 1, 2017).

ISA/EP, International Search Report and Written Opinion for International Application No. PCT/US2017/031134, 12 pages, dated Aug. 30, 2017 (Aug. 30, 2017).

ISA/EP, International Search Report and Written Opinion for International Application No. PCT/US2017/031140, 18 pages, dated Nov. 2, 2017 (Nov. 2, 2017).

(56) References Cited

OTHER PUBLICATIONS

ISA/EP, International Search Report and Written Opinion for International Application No. PCT/US2017/031421 13 pages, dated Jun. 21, 2017 (Jun. 21, 2017).
ISA/EP, International Search Report and Written Opinion for International Application No. PCT/US2017/031426 13 pages, dated Jun. 22, 2017 (Jun. 22, 2017).
ISA/EP, International Search Report and Written Opinion for International Application No. PCT/US2017/031431, 14 pages, dated Aug. 1, 2017 (Aug. 1, 2017).
ISA/EP, International Search Report and Written Opinion for International Application No. PCT/US2017/031434, 13 pages, dated Jun. 26, 2017 (Jun. 26, 2017).
ISA/EP, International Search Report and Written Opinion for International Application No. PCT/US2017/031439, 10 pages, dated Jun. 20, 2017 (Jun. 20, 2017).
ISA/EP, International Search Report and Written Opinion for International Application No. PCT/US2017/031824, 18 pages, dated Sep. 22, 2017 (Sep. 22, 2017).
ISA/EP, International Search Report and Written Opinion for International Application No. PCT/US2017/031827, 16 pages, dated Aug. 1, 2017 (Aug. 1, 2017).
ISA/EP, International Search Report and Written Opinion for International Application No. PCT/US2017/031831, 12 pages, dated Jul. 21, 2017 (Jul. 21, 2017).
ISA/EP, International Search Report for International Application No. PCT/US2017/031826, 16 pages, dated Feb. 27, 2018 (Feb. 27, 2018).
ISA/EP, Partial International Search Report for International Application No. PCT/US2017/031140, 13 pages, dated Aug. 29, 2017 (Aug. 29, 2017).
ISA/EP, Partial International Search Report for International Application No. PCT/US2017/031823, 12 pages, dated Nov. 30, 2017 (Nov. 30, 2017).
Dausch, et al., "Theory and Operation of 2-D Array Piezoelectric Micromachined Ultrasound Transducers", IEEE Transactions on Ultrasonics, and Frequency Control, vol. 55, No. 11;, Nov. 2008, 2484-2492.
Hopcroft, et al., "Temperature Compensation of a MEMS Resonator Using Quality Factor as a Thermometer", Retrieved from Internet: http://micromachine.stanford.edu/~amanu/linked/MAH_MEMS2006.pdf, 2006, 222-225.
Hopcroft, et al., "Using the temperature dependence of resonator quality factor as a thermometer", Applied Physics Letters 91. Retrieved from Internet: http://micromachine.stanford.edu/~hopcroft/Publications/Hopcroft_QT_ApplPhysLett_91_013505.pdf, 2007, 013505-1-031505-3.
Lee, et al., "Low jitter and temperature stable MEMS oscillators", Frequency Control Symposium (FCS), 2012 IEEE International, May 2012, 1-5.
Li, et al., "Capacitive micromachined ultrasonic transducer for ultra-low pressure measurement: Theoretical study", AIP Advances 5.12. Retrieved from Internet: http://scitation.aip.org/content/aip/journal/adva/5/12/10.1063/1.4939217, 2015, 127231.
Qiu, et al., "Piezoelectric Micromachined Ultrasound Transducer (PMUT) Arrays for Integrated Sensing, Actuation and Imaging", Sensors 15, doi:10.3390/s150408020, Apr. 3, 2015, 8020-8041.
Rozen, et al., "Air-Coupled Aluminum Nitride Piezoelectric Micromachined Ultrasonic Transducers at 0.3 MHz to 0.9 MHz", 2015 28th IEEE International Conference on Micro Electro Mechanical Systems (MEMS), IEEE, Jan. 18, 2015, 921-924.
Savoia, et al., "Design and Fabrication of a cMUT Probe for Ultrasound Imaging of Fingerprints", 2010 IEEE International Ultrasonics Symposium Proceedings, Oct. 2010, 1877-1880.
Shen, et al., "Anisotropic Complementary Acoustic Metamaterial for Canceling out Aberrating Layers", American Physical Society, Physical Review X 4.4: 041033., Nov. 19, 2014, 041033-1-041033-7.
Thakar, et al., "Multi-resonator approach to eliminating the temperature dependence of silicon-based timing references", Hilton Head'14. Retrieved from the Internet: http://blog.narotama.ac.id/wp-content/uploads/2014/12/Multi-resonator-approach-to-eliminating-the-temperature-dependance-of-silicon-based-timing-references.pdf, 2014, 415-418.
ISA/EP, Partial International Search Report for International Application No. PCT/US2019/034032, 8 pages, dated Sep. 12, 2019, 8.
ISA/EP, International Search Report and Written Opinion for International Application # PCT/US2018/063431, pp. 1-15, dated Feb. 5, 2019.
ISA/EP, International Search Report and Written Opinion for International Application # PCT/US2019/015020, pp. 1-23, dated Jul. 1, 2019.
ISA/EP, International Search Report and Written Opinion for International Application # PCT/US2019/023440, pp. 1-10, dated Jun. 4, 2019.
ISA/EP, International Search Report and Written Opinion for International Application No. PCT/US2018/037364, 10 pages, dated Sep. 3, 2018.
"Moving Average Filters", Waybackmachine XP05547422, Retrieved from the Internet: URL:https://web.archive.org/web/20170809081353/https//www.analog.com/media/en/technical-documentation/dsp-book/dsp_book_Ch15.pdf—[retrieved on Jan. 24, 2019], Aug. 9, 2017, 1-8.
Office Action for CN App No. 201780029016.7 dated Mar. 24, 2020, 7 pages.
"Receiver Thermal Noise Threshold", Fisher Telecommunication Services, Satellite Communications. Retrieved from the Internet: URL:https://web.archive.org/web/20171027075705/http//www.fishercom.xyz:80/satellite-communications/receiver-thermal-noise-threshold.html, Oct. 27, 2017, 3.
"Sleep Mode", Wikipedia, Retrieved from the Internet: URL:https://web.archive.org/web/20170908153323/https://en.wikipedia.org/wiki/Sleep_mode [retrieved on Jan. 25, 2019], Sep. 8, 2017, 1-3.
"TMS320C5515 Fingerprint Development Kit (FDK) Hardware Guide", Texas Instruments, Literature No. SPRUFX3, XP055547651, Apr. 2010, 1-26.
"ZTE V7 Max. 5,5" smartphone on MediaTeck Helio P10 cpu; Published on Apr. 20, 2016; https://www.youtube.com/watch?v=ncNCbpkGQzU (Year 2016).
Cappelli, et al., "Fingerprint Image Reconstruction from Standard Templates", IEEE Transactions on Pattern Analysis and Machine Intelligence, IEEE Computer Society, vol. 29, No. 9, Sep. 2007, 1489-1503.
Feng, et al., "Fingerprint Reconstruction: From Minutiae to Phase", IEEE Transactions on Pattern Analysis and Machine Intelligence, IEEE Computer Society, vol. 33, No. 2, Feb. 2011, 209-223.
Jiang, et al., "Ultrasonic Fingerprint Sensor with Transmit Beamforming Based on a PMUT Array Bonded to CMOS Circuitry", IEEE Transactions on Ultrasonics Ferroelectrics and Frequency Control, Jan. 1, 2017, 1-9.
Kumar, et al., "Towards Contactless, Low-Cost and Accurate 3D Fingerprint Identification", IEEE Transactions on Pattern Analysis and Machine Intelligence, IEEE Computer Society, vol. 37, No. 3, Mar. 2015, 681-696.
Pang, et al., "Extracting Valley-Ridge Lines from Point-Cloud-Based 3D Fingerprint Models", IEEE Computer Graphics and Applications, IEEE Service Center, New York, vol. 33, No. 4, Jul./Aug. 2013, 73-81.
Papageorgiou, et al., "Self-Calibration of Ultrasonic Transducers in an Intelligent Data Acquisition System", International Scientific Journal of Computing, 2003, vol. 2, Issue 2 Retrieved Online: URL: https://scholar.google.com/scholar?q=self-calibration+of+ultrasonic+transducers+in+an+intelligent+data+acquisition+system&hl=en&as_sdt=0&as_vis=1&oi=scholart, 2003, 9-15.
Ross, et al., "From Template to Image: Reconstructing Fingerprints from Minutiae Points", IEEE Transactions on Pattern Analysis and Machine Intelligence, IEEE Computer Society, vol. 29, No. 4, Apr. 2007, 544-560.
Zhou, et al., "Partial Fingerprint Reconstruction with Improved Smooth Extension", Network and System Security, Springer Berlin Heidelberg, Jun. 3, 2013, 756-762.

(56) References Cited

OTHER PUBLICATIONS

ISA/EP, International Search Report and Written Opinion for International Application No. PCT/US2020/039452, 11 pages, dated Sep. 9, 2020.
ISA/EP, Invition to Pay Additional Fees for International Application No. PCT/US2020/033854, 10 pages, dated Sep. 8, 2020.
ISA/EP, International Search Report and Written Opinion for International Application No. PCT/US2020/033854, 16 pages, dated Nov. 3, 2020.
ISA/EP, International Search Report and Written Opinion for International Application No. PCT/US2020/039208, 10 pages, dated Oct. 9, 2020.
ISA/EP, International Search Report and Written Opinion for International Application No. PCT/US2020/042427, 18 pages, dated Dec. 14, 2020.
ISA/EP, Partial Search Report and Provisional Opinion for International Application No. PCT/US2020/042427, 13 pages, dated Oct. 26, 2020.
Office Action for CN App No. 201780029016.7 dated Sep. 25, 2020, 7 pages.
Tang, et al., "11.2 3D Ultrasonic Fingerprint Sensor-on-a-Chip", 2016 IEEE International Solid-State Circuits Conference, IEEE, Jan. 31, 2016, 202-203.
ISA/EP, International Search Report and Written Opinion for International Application No. PCT/US2019061516, 14 pages, dated Mar. 12, 2020.
ISA/EP, International Search Report and Written Opinion for International Application No. PCT/US2021/021412, 12 pages, dated Jun. 9, 2021.
Taiwan Application No. 106114623, 1st Office Action, dated Aug. 5, 2021, pp. 1-8.

* cited by examiner

GENERATION OF AN ESTIMATED FINGERPRINT

RELATED APPLICATIONS

This application claims priority to and the benefit of U.S. Patent Provisional Patent Application 62/621,511, filed on Jan. 24, 2018, entitled "CROSS-SENSOR FINGERPRINT ENROLLMENT AND AUTHENTICATION," by Jonathan Baudot and Etienne DeForas, and assigned to the assignee of the present application, which is incorporated herein by reference in its entirety.

BACKGROUND

Fingerprint sensors have become ubiquitous in mobile devices as well as other applications for authenticating a user's identity. They provide a fast and convenient way for the user to unlock a device, provide authentication for payments, etc. In general, a user must enroll his or her fingerprint for every device including a fingerprint sensor. Because the size of a fingerprint sensor is in general smaller than the complete fingerprint, the enrollment process for each fingerprint sensor is typically a laborious process, which must be repeated for every device including a fingerprint sensory.

BRIEF DESCRIPTION OF THE DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

DESCRIPTION OF EMBODIMENTS

Figure 1:
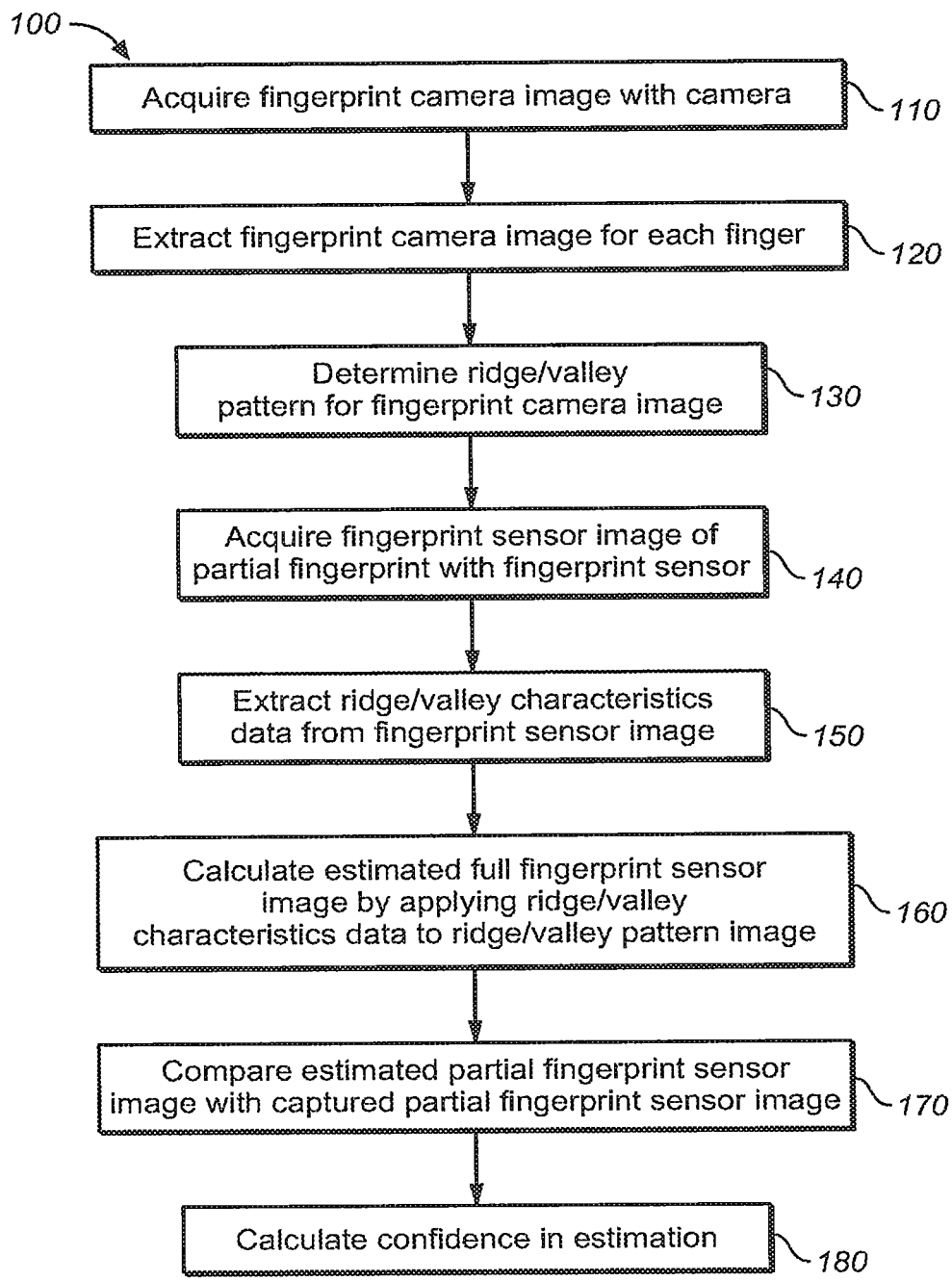
FIG. 1 illustrates a flow diagram of an example method for generating an estimated fingerprint, according to embodiments.

The following Description of Embodiments is merely provided by way of example and not of limitation. Furthermore, there is no intention to be bound by any expressed or implied theory presented in the preceding background or in the following Description of Embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of acoustic (e.g., ultrasonic) signals capable of being transmitted and received by an electronic device and/or electrical or magnetic signals capable of being stored, transferred, combined, compared, and otherwise manipulated in an electrical device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "receiving," "extracting," "generating," "acquiring," "updating," "determining," "comparing," "communicating," "converting," "authenticating" or the like, refer to the actions and processes of an electronic device such as an electrical device.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example fingerprint sensing system and/or mobile electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Generation of an Estimated Fingerprint

Fingerprint (fingerprint) sensors are used in devices for user authentication. Typical fingerprint sensors have a surface area of that is smaller than the complete fingerprint of a user. Because such a fingerprint sensor does not capture the complete fingerprint, and during use the user does not necessarily place their finger at exactly the same position on the fingerprint sensor, an enrollment process may be used to capture to complete fingerprint of the user. The enrollment process generally includes capturing a plurality of fingerprint images with the fingerprint sensor at different positions, in an attempt to capture the entire (or close to entire) fingerprint of the user. For example, a user interface may guide a user through the enrollment process, asking the user to move the finger between each image capture to cover the entire fingerprint. The plurality of fingerprint images thus captured, are then gathered, aggregated, combined and/or stitched together to form a complete fingerprint image or set of images that will be used in the user authentication process. This images or set of images may be referred to as the authentication reference image.

The enrollment process may require the capture of many images (e.g., 10-30 or more) per finger, where the user moves the finger between each image capture. This can be a laborious and time-consuming process, especially if more than one finger is to be used in the authentication process, since then the enrollment process is repeated for each finger. In addition, a user may have different devices with a fingerprint sensor, and the enrollment process may be required for each device or when the user replaces an old device with one sensor by a new device with another sensor.

For example, each individual fingerprint sensor may have its own characteristics that defines how the real or true fingerprint (profile) is converted to the fingerprint image as captured by the sensor, requiring a separate enrollment process for each fingerprint sensor. In devices that have a display, e.g., a smartphone, the user can be guided through the enrollment process by displaying instructions, messages and/or results. However, for devices or objects that have a fingerprint sensor but no display, e.g., a digital door knob or door handle with a fingerprint sensor, performing an enrollment process requiring multiple different images, would be more difficult.

Embodiments described herein provide of methods and techniques for a simplified enrollment process for a fingerprint sensor by generating an estimated fingerprint that can be used for fingerprint enrollment and authentication. In some embodiments, a ridge/valley pattern (e.g., a two-dimensional pattern) of a fingerprint of a finger is received. A sensor image including a partial fingerprint of the finger is received, where the sensor image is captured by a fingerprint sensor. Ridge/valley characteristics (e.g., the shape or profile of the ridge/valley combination) of the fingerprint are extracted from the sensor image including the partial fingerprint. An estimated fingerprint image is generated based on the ridge/valley pattern of the fingerprint and the ridge/valley characteristics of the fingerprint.

Other embodiments described herein provide methods and techniques for cross-sensor enrollment for a fingerprint, simplifying the enrollment process across multiple devices. A ridge/valley pattern for a fingerprint is received at a second electronic device from a first electronic device, where the ridge/valley pattern may be sensor-independent. A sensor image including a partial fingerprint of the finger is captured at a fingerprint sensor of the second device. The ridge/valley characteristics of the fingerprint are extracted from the sensor image including the partial fingerprint. An estimated fingerprint image is generated based on the ridge/valley pattern of the fingerprint received from the first electronic device and the ridge/valley characteristics of the fingerprint extracted at the second electronic device.

Camera-Assisted Enrollment

In a first example, embodiments for generating an estimated fingerprint using a combination of a camera and a fingerprint sensor of an electronic device is described. It should be appreciated that the fingerprint sensor may be any type of fingerprint sensor using different techniques, e.g., optical, capacitive or ultrasound fingerprint sensors. In the enrollment process of the described embodiment, an image (or images) of a fingerprint acquired with a camera, e.g., a camera of a smartphone, is combined with a sensor image (or images) of a partial fingerprint acquired by the fingerprint sensor.

The described embodiments combine the ridge/valley pattern as determined by the camera image with the fingerprint characteristics as determined by the fingerprint sensor. The ridge/valley pattern is defined as the two-dimensional pattern of the fingerprint, and the ridge/valley characteristics may be defined as a cross-section of a ridge/valley combination, for example, the variation of the pixel intensity over a ridge/valley. Examples of fingerprint characteristics include the shape or profile of a ridge/valley combination, the width variation of ridges and/or valleys, the intensity variations of the ridges and/or valleys, the location of the ridge on the finger, etc. The ridge/valley characteristics of a fingerprint image captured by a camera may be different than a ridge/valley characteristics as captured by the fingerprint sensor due to the use of different capturing technology, and thus a correction is made by combining the ridge/valley characteristics based on the sensor image with the ridge/valley pattern captured by a camera.

FIG. 1 illustrates a flow diagram 100 of an example method for generating an estimated fingerprint, according to embodiments. At procedure 110, a camera image of the fingerprint is acquired with using a camera, e.g., a smartphone camera. The camera may capture a camera image of a single finger or several fingers at the same time. In one embodiment, where the camera image includes several fingers, as shown at procedure 120, the image section for each finger is extracted to provide a camera image for each finger, and thus each fingerprint.

Figure 2A:
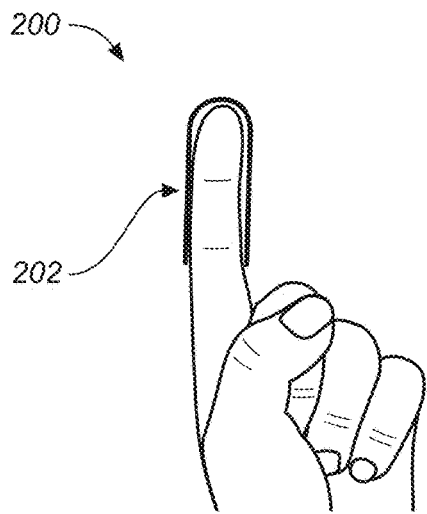
FIG. 2A shows an example of a camera image including a fingerprint taken with a camera, according to an embodiment.

FIG. 2A shows an example of a camera image 200 including a fingerprint taken with a camera. In some embodiments, user instruction for capturing camera image 200 is provided, e.g., on a display of the electronic device including the camera. For example, using a smartphone, line 202 indicates a position in the camera's view for placing the finger for image capture. Similar instruction may be given, when a plurality of fingers is captured at the same time.

Figure 2B:
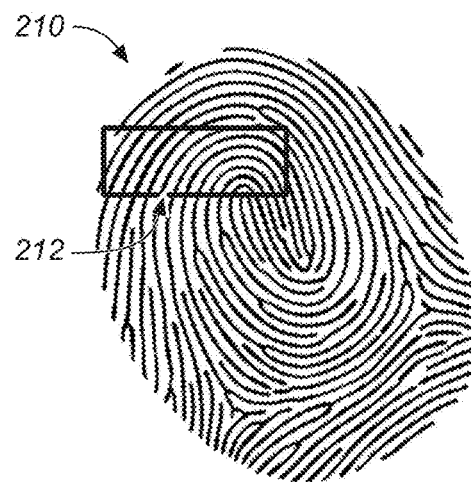
FIG. 2B shows an example of a ridge/valley pattern, according to an embodiment.

At procedure 130, based on the camera image of the fingerprint, a ridge/valley pattern of the fingerprint is determined. FIG. 2B shows an example of a ridge/valley pattern 210. The ridge/valley pattern 210 shows that the data of interest is the two-dimensional ridge/valley pattern, rather than the ridge/valley characteristics, e.g., the ridge/valley profile or shape. The ridge/valley pattern may also comprise indication of other fingerprint features, e.g., pores. It should be appreciated that the ridge/valley pattern for a fingerprint will be the same or similar for different sensors (either cameras or fingerprint sensors), but that the ridge/valley characteristics depend on the type of fingerprint sensor. Cameras are generally not equipped to capture the ridge/valley characteristics of a fingerprint. Moreover, the ridge/valley characteristics may differ across different fingerprint sensors of the same type (e.g., due to non-uniformities in the manufacturing). The ridge/valley pattern 210 may be a vector image showing the two-dimensional pattern of the ridges of the fingerprints. In other embodiments, the ridge/valley pattern used for estimating the fingerprint may be the captured camera image, where some processing may have been performed to optimize the pattern. The ridge/valley pattern 210 may also be referred to as a universal fingerprint image, or a sensor-independent fingerprint image, where the term "sensor" includes both "image sensor" (e.g., a camera) and a fingerprint sensor. In one embodiment, procedure 130 generates a sensor-independent fingerprint image by removing the ridge/valley characteristics of the fingerprint image which are dependent on the type of fingerprint sensor.

The camera image (e.g., camera image 200) may allow the capture of the complete, or at least a large part of, the user's fingerprint and its ridge/valley pattern (e.g., ridge/valley pattern 210). In some embodiments, the camera image or ridge/valley pattern may be post-processed to enable an efficient matching against images of fingerprint sensors, e.g., unrolled to compensate for the effect of the finger curvature when captured with the camera. Another effect that may be compensated for is that when the fingerprint is captured with the fingerprint sensor, the user presses the finger against a surface, while this is not the case for the fingerprint camera image. Thus, a correction for the compressing of the ridges and/or finger surface may be performed.

Different techniques may be applied to enhance the quality of the camera image of the fingerprint acquired by the camera. In one embodiment, light sources close to the camera may be controlled, e.g., to enhance the contrast of the fingerprint in the camera image. An example light source is a light-emitting diode (LED) placed close to the camera. For example, an image may be taken with the light source on and another image with the light source off. Comparison of the images may help improve the quality of the fingerprint in the camera image. In another embodiment, more than one light source may be used, and the light sources may be placed on different sides of the camera lens. By capturing images with different light sources from different sides, different sides of the ridges may be exposed to the emitted light. As such, by combining the different light sources, three-dimensional information concerning the ridge/valley characteristics or profiles may be determined.

Figure 2C:
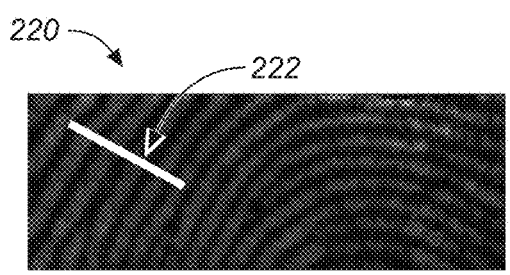
FIG. 2C shows an example fingerprint sensor image as captured with an ultrasonic fingerprint sensor, according to an embodiment.

At procedure 140, a sensor image including a partial fingerprint of the finger is captured at a fingerprint sensor. Since the fingerprint sensor is smaller than a fingerprint in most situations, this image includes a partial fingerprint image. FIG. 2C shows an example fingerprint sensor image 220 as captured with an ultrasonic fingerprint sensor. While FIGS. 2B and 2C are not to the same scale, and as seen from the ridge/valley pattern size, the fingerprint sensor image 220 corresponds to only part of the complete ridge/valley pattern 210 (indicated by black rectangular box 212). It should be appreciated that when fingerprint images are taken with different methods or different sensors, the ridge/valley pattern should be near identical, but the ridge/valley characteristics may be different because this may depend on the imaging technique used.

Figure 2D:
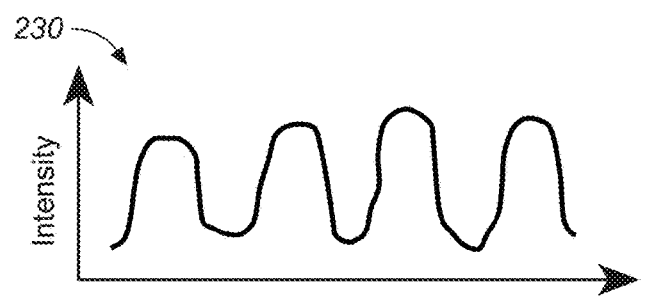
FIG. 2D shows a ridge/valley shape or profile, according to an embodiment.

Embodiments described herein generate an estimated fingerprint image that can be used for authentication of the user using the fingerprint sensor just as a full fingerprint image acquired at the fingerprint sensor. For this to work, the estimated fingerprint image should include the actual ridge/valley characteristics of the fingerprint as captured by the sensor. Currently, this image would be constructed from the plurality of images captured by the fingerprint sensor, requiring the lengthy, and undesired, enrollment process. As shown at procedure 150, embodiments herein extract the ridge/valley characteristics from the partial fingerprint image captured at the fingerprint sensor, which is then combined with the complete ridge/valley pattern, as based on the fingerprint camera image, to generate an estimated fingerprint sensor image of the complete fingerprint. The estimated fingerprint sensor image may also be referred to as a synthetic fingerprint sensor image or a predicted fingerprint sensor image. The estimated fingerprint sensor image should closely resemble a sensor image taken by the fingerprint sensor of the complete fingerprint. In one embodiment, the fingerprint sensor image as captured with the fingerprint sensor is analyzed to determine the ridge/valley characteristics, e.g., the ridge/valley shape or profile, by taking a cross-section profile perpendicular to the ridge at various points in the partial fingerprint image. As an example, FIG. 2D shows a ridge/valley shape or profile 230 along line segment 222 of FIG. 2C. An average ridge/valley shape may be determined and then combined with the ridge/valley pattern. The shape may be dependent on the ridge-to-ridge distance, and this effect may be taken into consideration. Several cross-sections at different locations within the sensor image may be taken to enhance the accuracy of the ridge/valley characteristics estimation.

Figure 2E:
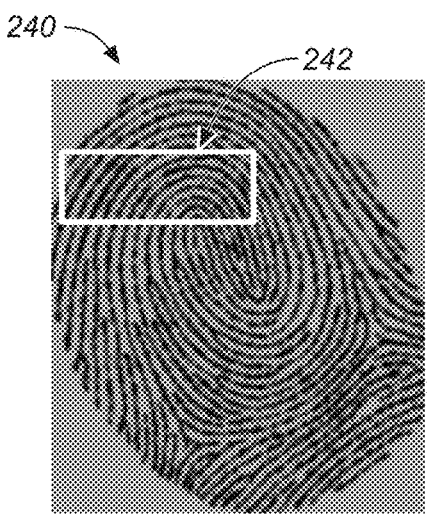
FIG. 2E shows an example estimated fingerprint image, according to an embodiment.

At procedure 160, the ridge/valley characteristics are combined with the ridge/valley pattern to generate the full estimated fingerprint image. This means that the ridge/valley characteristics are applied to all locations of the ridge/valley pattern. In one example embodiment, the ridge/valley profile, which may be dependent on the ridge/valley spacing, is applied to a vector graph, or similar graph, representing the ridge/valley pattern. In another example embodiment, the ridge/valley characteristic as estimated from the sensor image are used to modify the ridge/valley characteristics on the camera image. This may be performed using any existing image treatment method. For example, the grey level distribution may be adapted to transform the ridge/valley characteristics from the camera image like to sensor image which may, for example, make the valley deeper, less deep, wider, or narrower. An example estimated fingerprint image 240 is shown in FIG. 2E, which simulated the estimated fingerprint image. Box 242 in FIG. 2E represents a size of an actual captured fingerprint sensor image, corresponding to box 212 in FIG. 2B.

In some embodiments, as shown at procedure 170, the portion of the estimated fingerprint sensor image that was also captured by the fingerprint sensor can be compared to the partial fingerprint sensor image to determine the accuracy of the estimation. In other words, the portion of estimated fingerprint image 240 within box 242 can be compared with fingerprint sensor image 220. Based on this comparison, as shown at procedure 180, a confidence can be determined how accurate the estimated fingerprint image is and with what confidence it can be applied for user authentication. Any type of known image processing technique may be used to analyze and quantify the difference between the images. For example, the two images may be subtracted, and the amplitude or variance of the remaining features may be compared to the noise level to quantify the estimation quality. A confidence threshold may be used, and if the determined confidence is below this threshold it may be that the estimation did not work accurately enough to be used in authentication. If this is the case, the user may be prompted to capture another image with the fingerprint sensor, e.g., at a slightly different position, and then the process may be repeated. By acquiring multiple images, the ridge/valley characteristics may be determined more accurately, which may lead to a better estimation of the complete fingerprint sensor image. This process may be repeated until a complete fingerprint is obtained. In some embodiments, a second threshold may be used, lower than the threshold, and if the confidence is below the second threshold, the user may be prompted to perform a conventional enrollment. In another embodiment, the prediction does not work well, but in some situations the user is prompted for enough images that can be combined to use as an authentication reference image, which then basically resembles the basic enrollment process. Alternatively, or in addition, the confidence factor may also be used to adapt the parameters of the process, e.g., how to determine the ridge/valley characteristics. For example, initially a first process may be used which is faster but less accurate, and if this does not work, a second more elaborate process may be used. For example, the first process may run locally on the device, and the second process may run in the cloud. If the first process works, the second process is not required since sharing fingerprint data in the cloud may be more prone to privacy issues.

Once the estimated fingerprint image has been generated, it may be used in user authentication as the authentication reference image. The authentication reference image may be dynamically updated with real fingerprint image captured by the fingerprint sensor during the normal usage of the device. For example, if the recently captured image with the fingerprint image is similar to the authentication reference image, the authentication reference image may be updated with the recently captured image and a certain weight may be applied to the new image. The threshold used to compare the images and perform the update may be less stringent when only the estimated fingerprint image is available. As portions of the estimated fingerprint image are replaced with the actual fingerprint image, the stringency of the threshold can increase over time. The newly acquired fingerprint sensor images may also be compared to the predicted image and as such used to improve the prediction and estimation of the estimated fingerprint image for which no fingerprint sensor image has been captured up to that point. This is similar to the embodiment described above when the confidence is too low, but now dynamically updated during actual use of the device and fingerprint sensor. In accordance with some embodiments, over time, the authentication reference image, which initially was based on the estimated finger image, may consist of actual captured images.

In some embodiments, the fingerprint camera image can also be used to assist the enrollment on the fingerprint sensor in a different manner. In one embodiment, the fingerprint camera image may be used as a guide for algorithms to enroll using multiple fingerprint sensor images that capture only a small part of the fingerprint. Combining or stitching multiple fingerprint images of the same finger is a difficult task because the fingerprint images represent only a small part of the fingerprint, so enrollment algorithms traditionally fail to indicate which portion of the finger is missing and which regions are already covered by a finger enrollment process. Therefore, many images are required so that sufficient overlap is available for the generation of the compete authentication reference image. Using the complete ridge/valley pattern as obtained using the fingerprint camera image would allow the system to estimate the location of the fingerprint images, thus reducing the images required for the enrollment. This information may improve finger coverage estimation and user guidance during enrollment because it is easier to estimate how the user should move the finger to go to the missing parts.

In another embodiment, after the generation of the full fingerprint camera image, a partial fingerprint sensor image may be acquired and compared direct to the camera image. The quality of the fingerprint camera image may be analyzed, and if the quality is good enough and differences between the fingerprint camera image and the fingerprint sensor image is below a threshold, the full fingerprint camera image may be used directly as an authentication reference, without the need for the intermediary steps of estimation a full sensor image as described in flow diagram 100. As the different parts of the fingerprint are captured by the fingerprint sensor, the authentication reference based on the camera images may be gradually and dynamically replaced by the sensor images. If the quality check of the camera image determines the quality is below a threshold and/or the difference between the fingerprint camera image and fingerprint sensor image is above a threshold, the system may decide that a process as discussed in process 100 of FIG. 1 may be used or that an enrollment process as above is required. In other words, once a full fingerprint camera image is available and a first partial fingerprint sensor image is available, the system may analyze the quality of the camera image and compare the fingerprint camera image to the fingerprint sensor image, and based on this analysis and comparison decide which of the above techniques is best suited. This decision may also be based on security, performance, and/or latency requirements.

The embodiments described above explain a simplified fingerprint enrollment process using different sensors (e.g., a camera and a fingerprint sensor) of an electronic device. Fingerprint data is sensitive data and security is a concern. When applying these methods within a single device, it is easier to perform it securely than if implementing across multiple devices. The following embodiments describe cross-sensor enrollment using multiple devices, and any of the techniques discussed above may be applied below also, with or without modifications.

Cross-Sensor Enrollment

As describe above, enrolling fingerprints is a laborious process. Currently, each time a user acquires a new electronic device including a fingerprint sensor, the user must enroll each finger being used with the fingerprint sensor. Furthermore, for some devices it may be more difficult to perform an enrollment, either because of the position, location, form factor of the device, or because the device may not have a display or other means to guide the user. Each enrollment process for each electronic device is a distinct process, and currently there is no sharing or reusing of fingerprint information available to assist or speed up the enrollment process. Embodiments described herein allow for the use or reuse of at least a portion of the fingerprint data for a first fingerprint sensor when enrolling the fingerprint at a second fingerprint sensor. It should be appreciated that the first fingerprint sensor and the second fingerprint sensor may be similar type sensors, e.g., both capacitive sensors or both ultrasonic sensors, or the first sensor and the second sensor may be different type sensors, e.g., one capacitive sensor and one ultrasonic sensor.

The same methods and techniques discussed above in relation to the camera assisted enrollment may also be applied for cross-sensor enrollment and cross-device enrollment. The term cross-sensor enrollment is defined as meaning to perform the fingerprint enrollment using a first fingerprint sensor, and then using at least a portion of the enrollment data to perform user authentication using a second fingerprint sensor. The example of the camera-assisted enrollment discussed above, is an example of cross-sensor enrollment. The term cross-device enrollment is defined as meaning to perform the fingerprint enrollment using a first fingerprint sensor on a first device, and then using the enrollment data to perform user authentication on a second device using a second fingerprint sensor.

Figure 3:
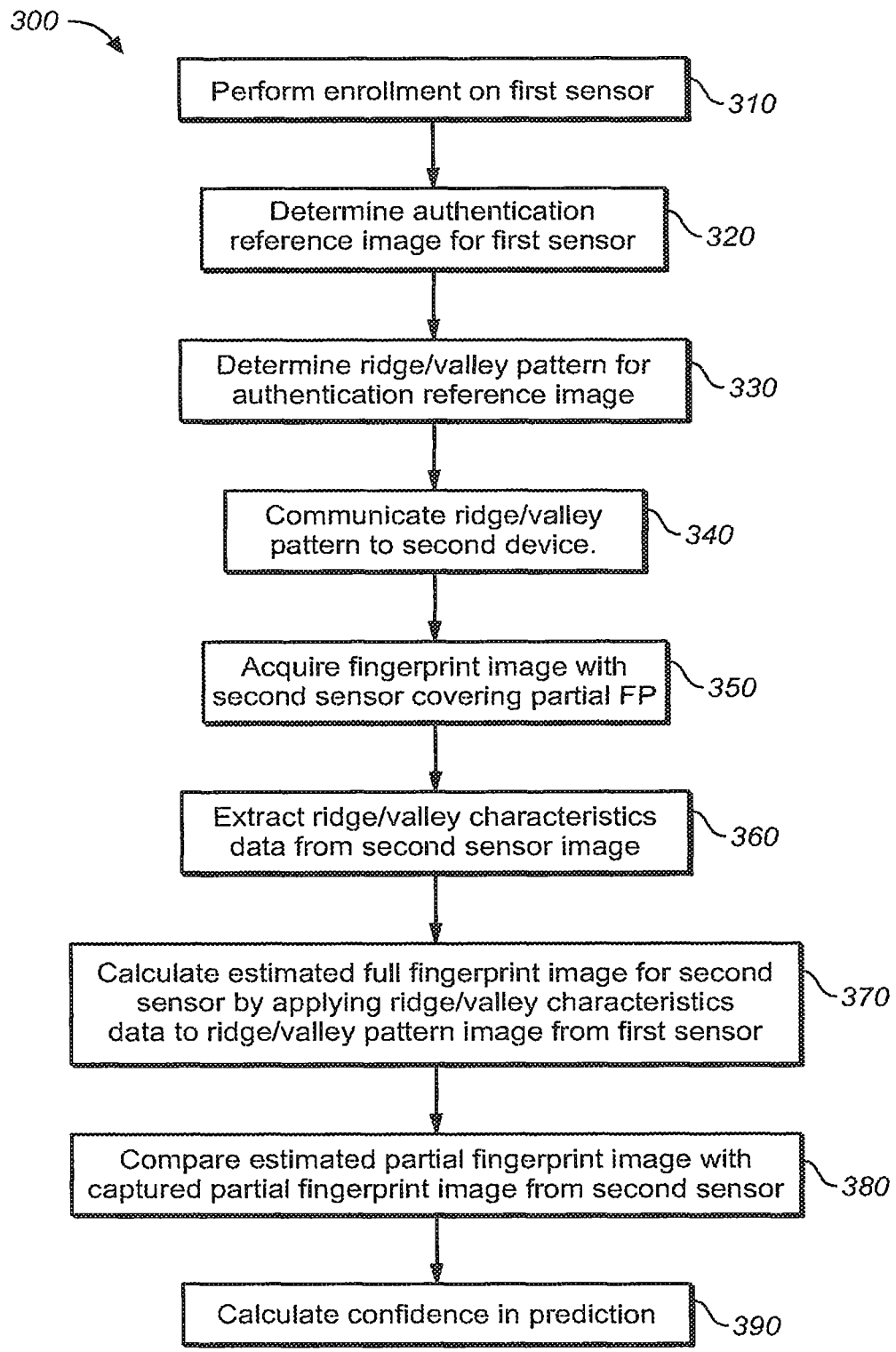
FIG. 3 illustrates a flow diagram of an example method for cross sensor enrollment of a fingerprint, according to embodiments.
Figure 4A:
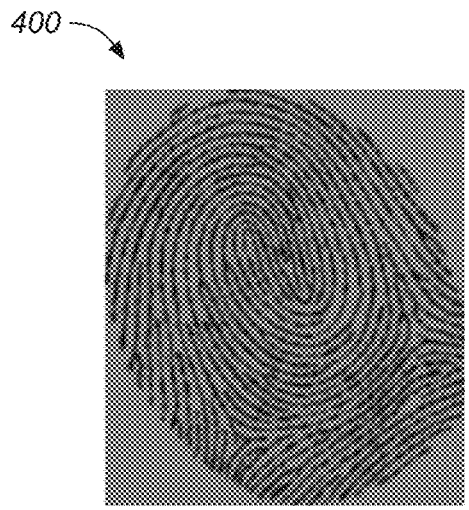
FIG. 4A shows an example constructed full fingerprint image, according to an embodiment.

FIG. 3 illustrates a flow diagram 300 of an example method for cross-sensor enrollment of a fingerprint, according to embodiments. It should be appreciated that flow diagram 300 is similar to flow diagram 100, and that some or all of the techniques discussed above for the camera-assisted enrollment may also apply to this embodiment, some steps may be optional, or may be performed in another order. At procedure 310, the enrollment process is performed on the first sensor. In one embodiment, procedure 310 is performed according to flow diagram 100 of FIG. 1. In other embodiment, enrollment on the first device may be similar to conventional enrollment. As shown at procedure 320, if the surface area of the first sensor is smaller than the fingerprint, the enrollment may consist of taking a plurality of images at different positions, and then the images are gathered, aggregated and/or stitched together to obtain a complete or full fingerprint image that can be used as an authentication reference image for the first sensor. An example constructed full fingerprint image 400 is shown in FIG. 4A.

Figure 4B:
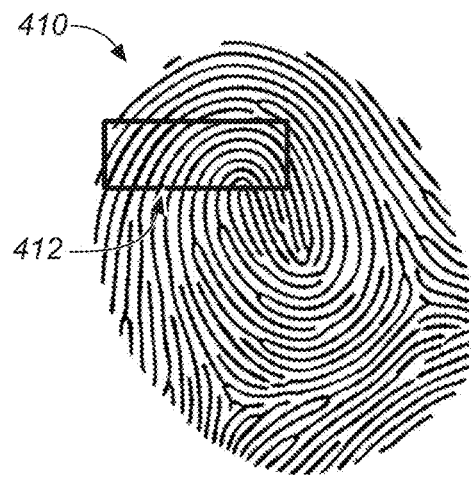
FIG. 4B shows an example of a ridge/valley pattern, according to an embodiment.

At procedure 330, based on the authentication reference image of the fingerprint corresponding the to the first sensor, a ridge/valley pattern of the fingerprint is determined. FIG. 4B shows an example of a ridge/valley pattern 410. At procedure 340, this ridge/valley pattern image is then shared/communicated with the second device including the second sensor. In one embodiment, a successful authentication may be required before sharing or communicating the fingerprint data with the second device. Additional user verification techniques may be applied in addition to confirm the authenticity of the user, using other types of sensors such as for example motion sensor (e.g., gesture recognition), audio sensors (e.g., voice recognition), or image sensors (e.g., face recognition). Communication of the fingerprint data from the first device to the second device may be encrypted. Techniques for securely transferring the fingerprint data are known to the person skilled in the art of secure data transfer. If additional sensor data is used for user authentication, the data may also be securely transferred with the fingerprint data. In some embodiments, step 320 and 330 may be inversed, meaning that the authentication reference image corresponding the to the first sensor is transferred to the second device, and the ridge/valley pattern is determined at the second device. For security reasons, and avoid any fraud, the user may be required to perform the process for a first finger and a second finger, followed by a validation step required the simultaneous pressing of the first finger on the first device and the second finger on the second device.

Figure 4C:
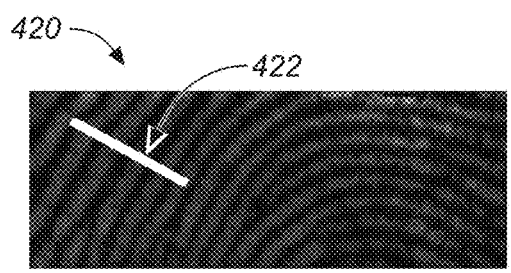
FIG. 4C shows an example fingerprint sensor image as captured with an ultrasonic fingerprint sensor, according to an embodiment.
Figure 4D:
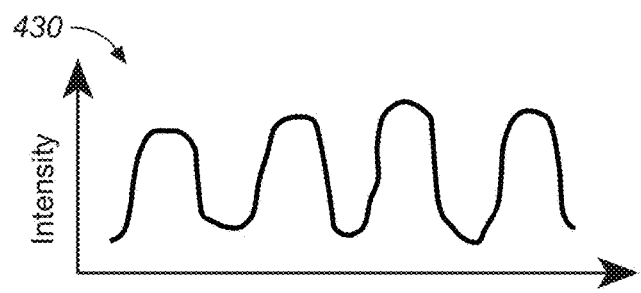
FIG. 4D shows a ridge/valley shape or profile, according to an embodiment.

At procedure 350, a sensor image including a partial fingerprint of the finger is captured at a fingerprint sensor, e.g., the second sensor in the second device. Since the fingerprint sensor is smaller than a fingerprint in most situations, this image includes a partial fingerprint image. FIG. 4C shows an example fingerprint sensor image 420 as captured with an ultrasonic fingerprint sensor. At procedure 360, embodiments herein extract the ridge/valley characteristics from the partial fingerprint image captured at the fingerprint sensor, which is then combined with the complete ridge/valley pattern, to generate an estimated fingerprint sensor image of the complete fingerprint corresponding to the second sensor in the second device. As an example, FIG. 4D shows a ridge/valley shape or profile 430 along line segment 422 of FIG. 4C. An average ridge/valley shape may be determined and then combined with the ridge/valley pattern. The shape may be dependent on the ridge-to-ridge distance, and this effect may be taken into consideration.

Figure 4E:
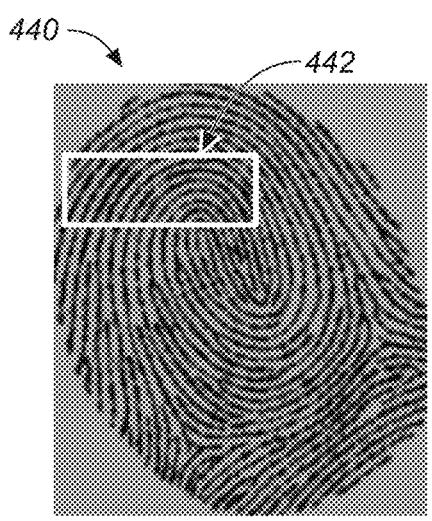
FIG. 4E shows an example estimated fingerprint image, according to an embodiment.

At procedure 370, the ridge/valley characteristics are combined with the ridge/valley pattern to generate the full estimated fingerprint image. An example estimated fingerprint image 440 is shown in FIG. 4E, which simulated the estimated fingerprint image. Box 442 in FIG. 4E represents a size of an actual captured fingerprint sensor image. In one embodiment, the fingerprint image as captured with the second sensor is analyzed to determine an average ridge/valley shape, and the determined shape may then be applied to the ridge/valley pattern as determined by the first sensor to create the complete estimated fingerprint image for the second sensor.

In some embodiments, as shown at procedure 380, the portion of the estimated fingerprint sensor image that was also captured by the fingerprint sensor can be compared to the partial fingerprint sensor image to determine the accuracy of the estimation. In other words, the portion of estimated fingerprint image 440 within box 442 with fingerprint sensor image 420 can be compared. Based on this comparison, as shown at procedure 390, a confidence can be determined how accurate the estimated fingerprint image is and with what confidence it can be applied for user authentication. Details of procedures 380 and 390 are similarly above in procedures 170 and 180, and can used here.

As discussed in relation to the camera-assisted enrollment, the quality of the authentication reference from the first sensor may be analyzed, and the reference from the first sensor may be compared to the acquired partial fingerprint sensor image of the second sensor, and based on this analysis and comparison the best strategy is selected. If the quality of the reference from the first sensor is good, and the different between the reference image and the captured image from the second sensor is small, the reference from the first sensor may be directly used as an authentication reference for the second sensor, and this reference may be gradually updated as partial fingerprint sensor images with the second sensor are acquired. Other embodiments, as discussed in relation to the camera-assisted enrollment may also be applied here, e.g., modifying the authentication reference image from the first sensor using the ridge/valley characteristics of the second sensor using image processing techniques.

Figure 5:
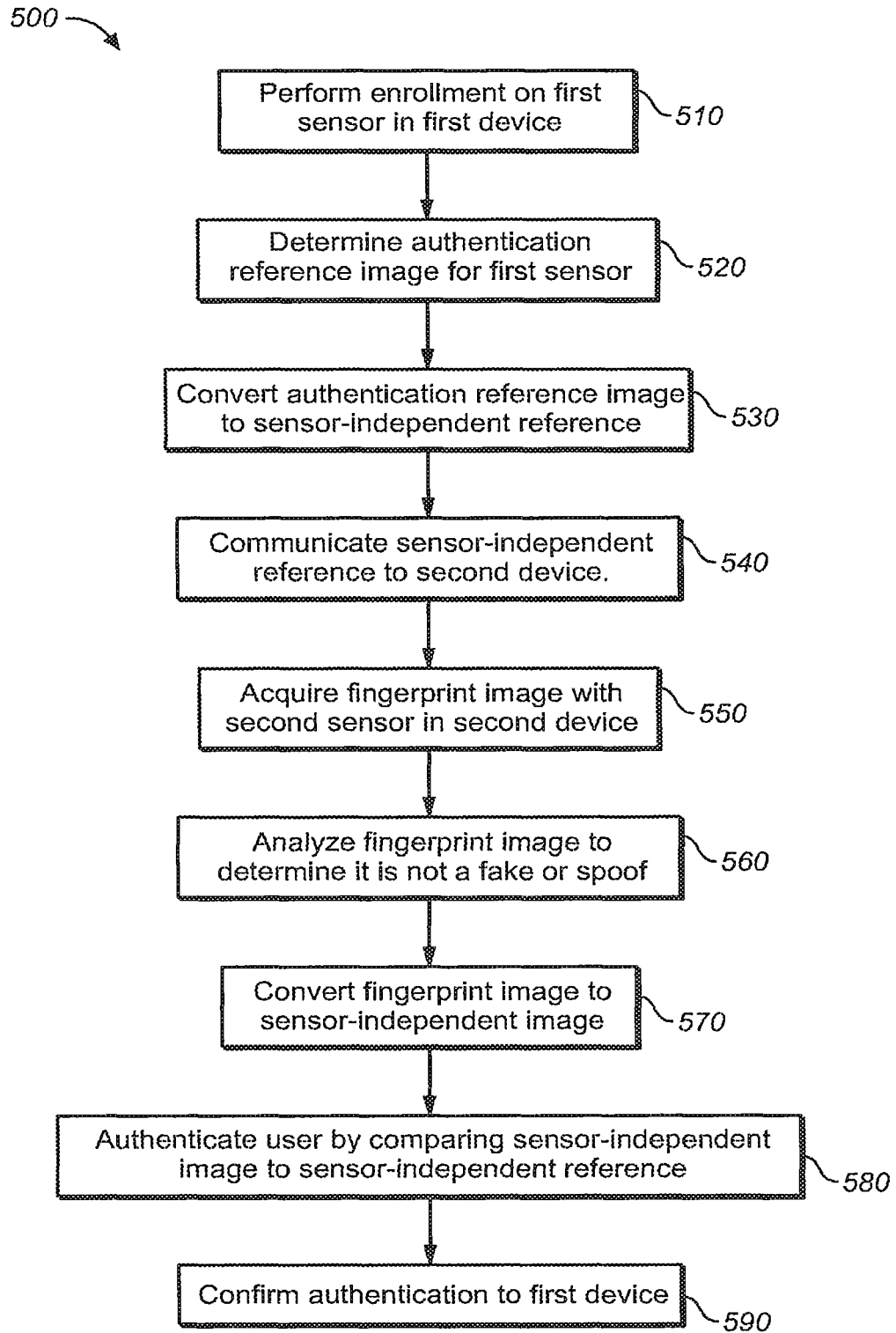
FIG. 5 illustrates a flow diagram of an example method for cross sensor enrollment of a fingerprint, according to other embodiments.

FIG. 5 shows a flow diagram 500 of an alternative embodiment of the concepts discussed above. It should be appreciated that some of the procedures may be optional, or the procedures may be performed in a different order. At procedure 510, the enrollment process is performed on the first sensor. In one embodiment, procedure 510 is performed according to flow diagram 100 of FIG. 1. As shown at procedure 520, if the surface area of the first sensor is smaller than the fingerprint, the enrollment may consist of taking a plurality of images at different positions, and then the images are gathered, aggregated and/or stitched together to obtain a complete or full fingerprint image that can be used as an authentication reference image for the first sensor. An example constructed full fingerprint image 400 is shown in FIG. 4A.

At procedure 530, the authentication reference image is processed and converted to a sensor-independent reference image or sensor-independent fingerprint reference image. In one embodiment, the sensor-independent image may be a vector image or a set of vectors describing the ridge, valleys, and/or other features of the fingerprint. In another embodiment, the sensor dependent image is converted to a sensor independent image by removing any sensor transformation. The sensor transformation is defined as the transformation of the real/actual fingerprint of the user to the finger image as captured by a particular sensor. Images captured by different sensors may be different due to the characteristics that are unique to a type of sensor or to a particular sensor, e.g., caused by non-uniformities in the sensor stack. For example, the transformation data defines how the actual ridge/valley profile is converted into the image ridge/valley profile for the capturing sensor. For example, ridges in the captured images may be narrower or wider than they actually are, or the valleys may be deeper or less deep than they actually are. In a perfect sensor, this is a unity transformation, meaning that the image ridge/valley profile is identical to the real ridge/valley profile. However, differences may occur, for example, due to any non-linear effect during image capture at the particular sensor. The transformation function may be determined during a calibration process, and may be stored on the sensor. The transformation function may be any linear or non-linear function applied to the sensor signal or converted pixel values to correct or compensate for the sensor transformation.

Once the sensor-independent reference image has been generated, as shown at procedure 540, it may be transferred to the second device. This communication may be wired, wireless, and may comprise any type of encryption to improve security. In some embodiments, to initiate the transfer, a successful authentication of the user must first be accomplished. This authentication may comprise an anti-spoof or anti-fake procedure/check to improve security. Once the sensor-independent reference image has been received on the second device, as shown at procedure 550, a fingerprint image is acquired using the second sensor of the second device. The second device may prompt the user to do so, or if the second device has no means to prompt the user (e.g., no display in case of door knob), the communication may pass through the first device, e.g., using the display or speaker of the first device.

In one embodiment, as shown at procedure 560, the acquired fingerprint image may first be verified to determine it is not a fake or spoof, for example by analyzing the ridge/valley characteristics. If it is determined the acquired fingerprint image corresponds to a real finger, as shown at procedure 570, the fingerprint image may be processed and converted to a sensor-independent image. It should be appreciated that the determination whether the fingerprint is from a real finger may also be performed at a different time in flow diagram 500, e.g., after the authentication. The conversion to a sensor-independent image may be performed as discussed above using a sensor transformation function. If the first sensor and second sensor are similar type sensors, the transformation function may be identical. If the first sensor and second sensor are different types of sensors, each sensor will have its own transformation function.

At procedure 580, the user may be authenticated by comparing the sensor-independent fingerprint image as captured using the second sensor in the second device to the sensor-independent reference image captured using the first sensor on the first device. In one embodiment, as shown at procedure 590, the successful authentication on the second device may be reported to the first device. The confirmation data communicated back to the first device may also comprise additional data concerning the fingerprint estimation process, e.g., a quality factor or confidence factor of the fingerprint estimation.

In some embodiments, timing limits may be imposed for the procedure for added security. For example, in one embodiment, after sending the sensor-independent reference image from the first device, a successful authentication of the user on the second device, and/or a confirmation back to the first device, must take place within a certain time to validate the process. If this is not the case, the reference image may be refused/deleted from the second device. An additional, successful authentication may be required on the first device after the confirmation.

Additional user verification data may also be required for the second device before the second device allows an enrollment or registration of a user on the second device. This additional validation step may also pass through the first device, or may be assisted by the first device. In some embodiments, this may be a verification code or password. In some embodiments, e.g., where multiple user should be able to use the second device and be authenticated by the second sensor, a successful authentication of another user, e.g., a master user, may be required at one or more instances during the procedure for the process to be authorized.

When communicating sensor-independent reference images from a first device to a second device, additional data may be communicated and stored on the second device with the sensor-independent reference image. For example, data and information about the user, the first device, and/or the first sensor may be stored. Knowledge about the first sensor may help correction for sensor transformations and improved thereby the accuracy of the estimated fingerprint image. In addition, or alternatively, the first device may also store data and information about the second device and/or the second sensor, to which the sensor-independent reference image was communicated. The second device may also communicate data related to future user authentications back to the first device. This data may relate to the authentication efficiency of the second sensor, such as the quality of the authentication, the confidence of the authentication, the rejection rate, etc. The data may give an indication of the successfulness of the transfer and user of the sensor-independent reference image transfer, and may be used for improvement of the process, e.g., the processing required to determine the sensor-independent reference image.

Once the second device comprises the sensor-independent reference image, it may be used for authentication of the user. The second device may then be involved in identical procedures to transmit the fingerprint enrollment and authentication data to a third device with a third fingerprint sensor. Any transfer from one device to another device may be reported to the different device, or back to the first/original/master device.

The term sensor-independent fingerprint image may refer to different types of fingerprint images and may be implemented in many different ways. In general, a sensor-independent fingerprint image refers to a fingerprint image that is processed, modified, and/or normalized so that it may be shared and used for a different fingerprint sensor. The sharing may be limited to a certain type of sensor. For example, the sensor-independency may be limited to an ultrasonic fingerprint sensor, meaning the sharing may works for different ultrasonic fingerprint sensor but not necessary on other types of sensors, such as capacitive sensors. The sensor-independency may also cover all types of different fingerprint sensors, including ultrasonic, capacitive, and/or optical sensor. When initiating the communication from the first device to the second device, or vice-versa, a verification step may be performed to make sure the process may be started. For example, a check may be performed if there is enough compatibility between the sensors, if they are the same type of sensor (if this is required), or if sharing the sensor-independent authentication data is allowed and/or possible (between the devices or groups of devices). In some embodiments and extra authorization step may be performed here, requesting permission from another device and/or user. Any of the embodiments, concepts, or principles discussed in relation to FIG. 5 and the sensor independent images, may also be applied in combination with the previous discussed embodiments.

Figure 4F:
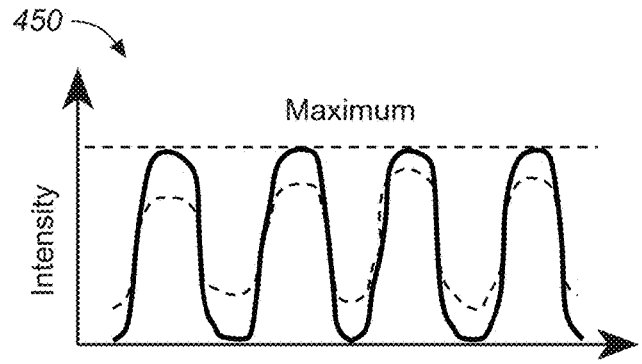
FIG. 4F shows an example normalized ridge/valley shape or profile, according to an embodiment.

In some embodiments, the sensor-independent fingerprint image is generated by normalizing the estimated fingerprint image. FIG. 4F shows an example normalized ridge/valley shape or profile 450 of profile 430 of FIG. 4D, where profile 430 is shown in dashed lines and the normalized shape or profile is shown as a solid line. Normalized ridge/valley shape or profile 450 shows that all ridges are scaled to a maximum and all valleys are scaled to a minimum, that that the ridge/valley shape has not been modified. In some embodiments, the ridge/valley shape may also be modified. The ridges and/or valleys may be given a uniform width or their width may remain according to the acquired images. For example, the images may be binarized with a threshold e.g. a half-height between ridge and valley. The ridge/valley shape may be normalized to any desired shape, such as e.g. Gaussian, linear, high-order, etc.

In one embodiment, the conversion to sensor-independent fingerprint images includes converting the ridge/valley characteristics and profiles to approximate as closely as possible to actual or true ridge/valley characteristics and profiles of the actual finger and fingerprint, which may include the curvature of the finger. In many devices with fingerprint sensors, the user pushes the sensor against a hard surface, thereby deforming the finger and possible the ridge/valley profile, depending on the amount of applied pressure. However, this deformation is gradual, and by following the fingerprint image from the time of a first contact (in theory a small point) to a full fingerprint image, information about the shape of the finger and ridge/valley profile can be deduced. Therefore, in one embodiment, by analyzing the changes in the fingerprint image as the user presses his or her finger on the hard sensor surface, data can be deduced on the actual shape of the finger and ridge/valley pattern. This information may then be used to convert the finally acquired fingerprint image to the actual or true ridge/valley characteristics and profiles of the actual finger and fingerprint. In other embodiments, empirical or experimental techniques may be used to determine a conversion algorithm, matrix or method, between an acquired fingerprint image and the true fingerprint characteristics. For example, based on optical non-contact methods the fingerprints and their profiles of one or more users (crowd-sourcing) may be determined, and then the correct conversion may be determined. This conversion method may then be used as a standard in all types of sensors for which this validation may be performed. The conversion may be dependent on other characteristics of the user, if this improves accuracy, such as age, gender, size, ethnicity. This means the conversion is predetermined, and then stored in the fingerprint sensor or communicated to the fingerprint sensor when required.

In some embodiments, the authentication of the user may be performed by using the estimated fingerprint image that estimates the fingerprint authentication reference image as if captured by the sensor itself, as discussed in relation to FIG. 3. In other embodiments, the authentication of the user may be performed by using the sensor-independent authentication reference image, as discussed in relation to FIG. 5. The latter method comprises a procedure 570 where the captured sensor image is converted to a sensor-independent image before performing the authentication. This is an additional processing step, which may introduce additional inaccuracies or errors. Therefore, in some embodiments, the sensor-independent reference image may be used for transfer between devices, and based on the transferred sensor-independent reference image the estimated authentication reference image for the sensor is generated, which then serves as the bases for the user authentication.

Figure 6:
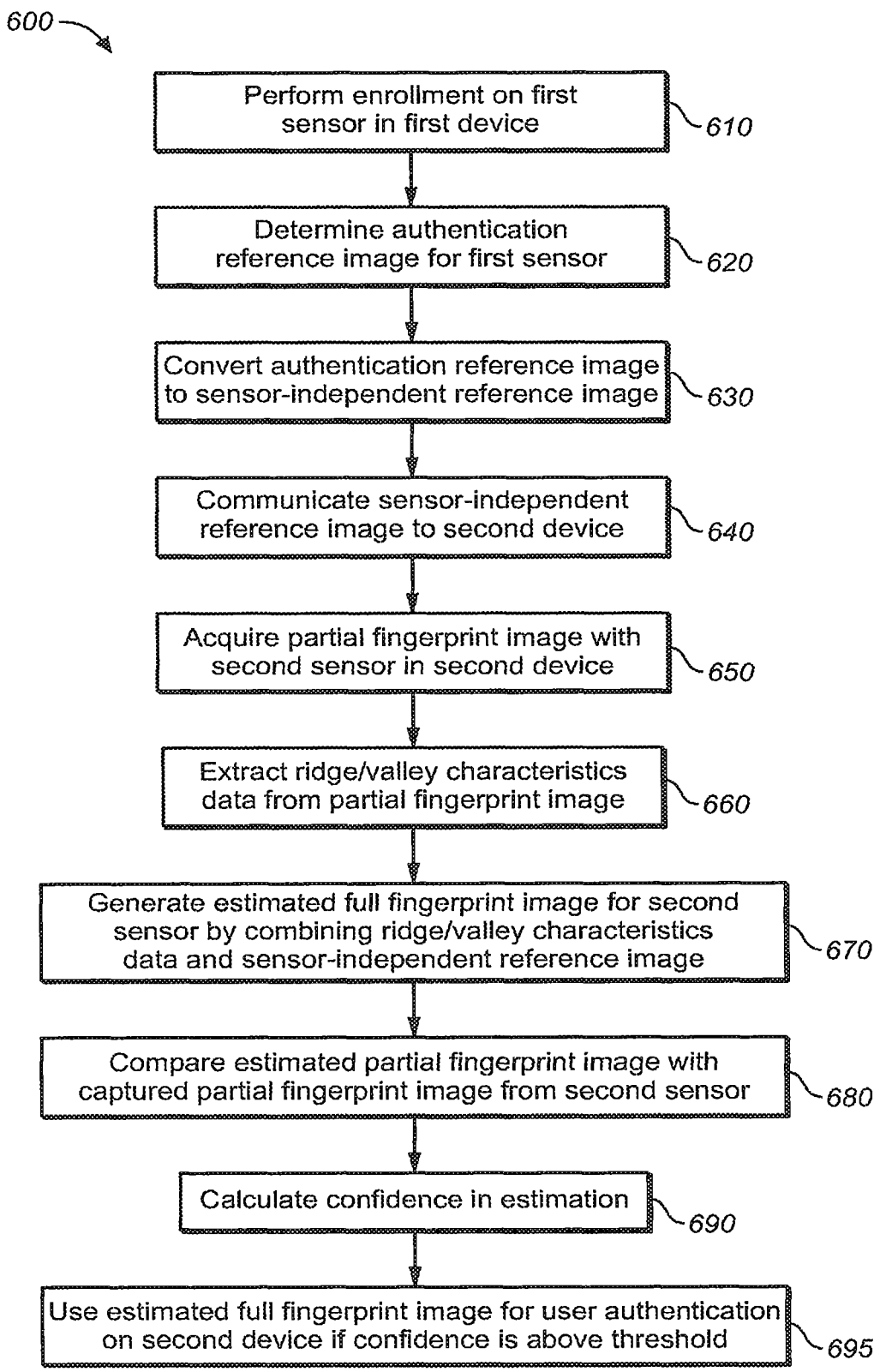
FIG. 6 show a flow diagram of an example method for normalizing a fingerprint image, according to an embodiment.

FIG. 6 shows a flow diagram 600 of an alternative embodiment of the concepts discussed above. It should be appreciated that some of the procedures may be optional, or the procedures may be performed in a different order. At procedure 610, the enrollment process is performed on the first sensor. In one embodiment, procedure 610 is performed according to flow diagram 100 of FIG. 1. As shown at procedure 620, if the surface area of the first sensor is smaller than the fingerprint, the enrollment may consist of taking a plurality of images at different positions, and then the images are gathered, aggregated and/or stitched together to obtain a complete or full fingerprint image that can be used as an authentication reference image for the first sensor. An example constructed full fingerprint image 400 is shown in FIG. 4A.

At procedure 630, the authentication reference image is processed and converted to a sensor-independent reference image or sensor-independent fingerprint reference image. In one embodiment, the sensor-independent image may be a vector image or a set of vectors describing the ridge, valleys, and/or other features of the fingerprint. In another embodiment, the sensor dependent image is converted to a sensor independent image by removing any sensor transformation. The sensor transformation is defined as the transformation of the real/actual fingerprint of the user to the finger image as captured by a particular sensor. Images captured by different sensors may be different due to the characteristics that are unique to a type of sensor or to a particular sensor, e.g., caused by non-uniformities in the sensor stack. For example, the transformation data defines how the actual ridge/valley profile is converted into the image ridge/valley profile for the capturing sensor.

Once the sensor-independent reference image has been generated, as shown at procedure 640, it may be transferred to the second device. This communication may be wired, wireless, and may comprise any type of encryption to improve security. In some embodiments, to initiate the transfer, a successful authentication of the user must first be accomplished. This authentication may comprise an anti-spoof or anti-fake procedure/check to improve security.

Once the sensor-independent reference image has been received on the second device, as shown at procedure 650, a fingerprint image is acquired using the second sensor of the second device. Since the fingerprint sensor is smaller than a fingerprint in most situations, this image includes a partial fingerprint image. FIG. 4C shows an example fingerprint sensor image 420 as captured with an ultrasonic fingerprint sensor. At procedure 660, embodiments herein extract the ridge/valley characteristics from the partial fingerprint image captured at the fingerprint sensor, which is then combined with the complete ridge/valley pattern, to generate an estimated fingerprint sensor image of the complete fingerprint corresponding to the second sensor in the second device. As an example, FIG. 4D shows a ridge/valley shape or profile 430 along line segment 422 of FIG. 4C. An average ridge/valley shape may be determined and then combined with the ridge/valley pattern. The shape may be dependent on the ridge-to-ridge distance, and this effect may be taken into consideration.

At procedure 670, the ridge/valley characteristics are combined with the ridge/valley pattern to generate the full estimated fingerprint image. An example estimated fingerprint image 440 is shown in FIG. 4E, which simulated the estimated fingerprint image. Box 442 in FIG. 4E represents a size of an actual captured fingerprint sensor image. In one embodiment, the fingerprint image as captured with the second sensor is analyzed to determine an average ridge/valley shape, and the determined shape may then be applied to the ridge/valley pattern as determined by the first sensor to create the complete estimated fingerprint image for the second sensor.

In some embodiments, as shown at procedure 680, the portion of the estimated fingerprint sensor image that was also captured by the fingerprint sensor can be compared to the partial fingerprint sensor image to determine the accuracy of the estimation. In other words, the portion of estimated fingerprint image 440 within box 442 with fingerprint sensor image 420 can be compared. Based on this comparison, as shown at procedure 690, a confidence can be determined how accurate the estimated fingerprint image is and with what confidence it can be applied for user authentication. Details of procedures 680 and 690 are similarly above in procedures 170 and 180, and can used here.

At procedure 695, the user may be authenticated by comparing the true fingerprint image as captured using the second sensor in the second device to the true fingerprint reference.

The processing to generate the sensor-independent fingerprint images may be performed using many different methods. Several embodiments are listed below, and they may be used by itself or in combination with each other. The list of embodiments is not considered to be exhaustive. In one embodiment, the processing may comprise detecting the ridges and valleys and then correction or normalizing all ridges to a certain ridge reference value and all the valleys to a valley reference value. In one example, the valley reference value may be the minimum (e.g., 0) and the ridge reference value may be the maximum (e.g., 1 or a maximum amount of gray levels). This would also remove any unwanted background signal or darkfield signals. The signal between the ridges and valleys may be scaled accordingly. In one embodiment, the ridge/valley shape may be unaltered as measured in the acquired fingerprint image.

Example Operations for Camera-Assisted Enrollment and Cross-Sensor Enrollment

Figure 7:
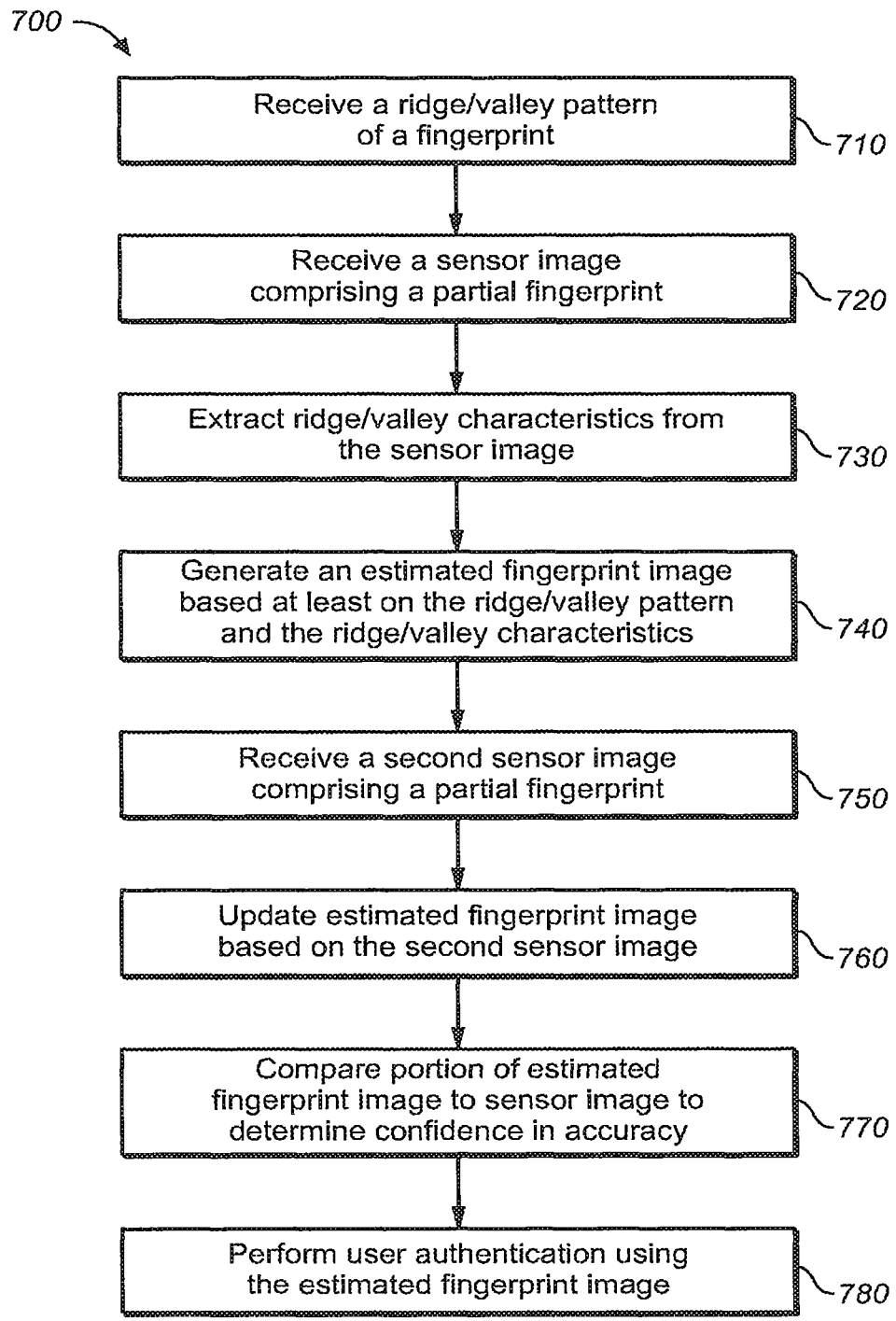
FIG. 7 show a flow diagram of an example method for cross-sensor enrollment using a true fingerprint image, according to an embodiment.

FIG. 7 illustrates a flow diagram 700 of example methods for camera-assisted enrollment and cross-sensor enrollment according to various embodiments, procedures of these methods will be described with reference to elements and/or components of various figures described herein. It is appreciated that in some embodiments, the procedures may be performed in a different order than described, that some of the described procedures may not be performed, and/or that one or more additional procedures to those described may be performed. The flow diagrams include some procedures that, in various embodiments, are carried out by one or more processors (e.g., a host processor or a sensor processor) under the control of computer-readable and computer-executable instructions that are stored on non-transitory computer-readable storage media. It is further appreciated that one or more procedures described in the flow diagrams may be implemented in hardware, or a combination of hardware with firmware and/or software.

With reference to procedure 710, a ridge/valley pattern of a fingerprint of a finger is received. In one embodiment, a camera image comprising the fingerprint of the finger is received. The ridge/valley pattern of the fingerprint is extracted from the camera image comprising the fingerprint. In one embodiment, the camera image comprising the fingerprint of the finger is acquired at a camera of an electronic device. In one embodiment, the ridge/valley pattern is received from a second device. In one embodiment, the ridge/valley pattern comprises a sensor-independent fingerprint pattern. In one embodiment, the ridge/valley pattern is comprised within a sensor-independent fingerprint reference image received from another electronic device.

In one embodiment, a camera image comprising a plurality of fingerprints of a plurality of fingers is received. The ridge/valley pattern of the fingerprint of the finger is extracted from the camera image comprising the plurality of fingerprints. In one embodiment, a second ridge/valley pattern of a second fingerprint of a second finger is extracted from the camera image comprising the plurality of fingerprints. In one embodiment, a second estimated fingerprint image is generated based at least in part on the second ridge/valley pattern of the second fingerprint and the ridge/valley characteristics of the fingerprint.

At procedure 720, a sensor image comprising a partial fingerprint of the finger is received. In one embodiment, the sensor image comprising the partial fingerprint of the finger is acquired at a fingerprint sensor of an electronic device. At procedure 730, ridge/valley characteristics of the fingerprint from the sensor image comprising the partial fingerprint are extracted. At procedure 740, an estimated fingerprint image is generated based at least on the ridge/valley pattern of the fingerprint and the ridge/valley characteristics of the fingerprint.

In one embodiment, as shown at procedure 750, a second sensor image comprising a second partial fingerprint of the finger is received. At procedure 760, the estimated fingerprint image is updated based on the second partial fingerprint.

In one embodiment, as shown at procedure 770, a portion of the estimated fingerprint image comprising the partial fingerprint is compared to the sensor image comprising the partial fingerprint. A confidence in accuracy of the estimated fingerprint image is determined based at least in part on the comparing. In one embodiment, provided the confidence in accuracy of the estimated fingerprint image does not satisfy a confidence threshold, it is determined that the estimated fingerprint image is not satisfactory for authentication.

In one embodiment, as shown at procedure 780, the user authentication is performed using the estimated fingerprint image.

Example Electronic Device and Sensor Processing Unit

Figure 8:
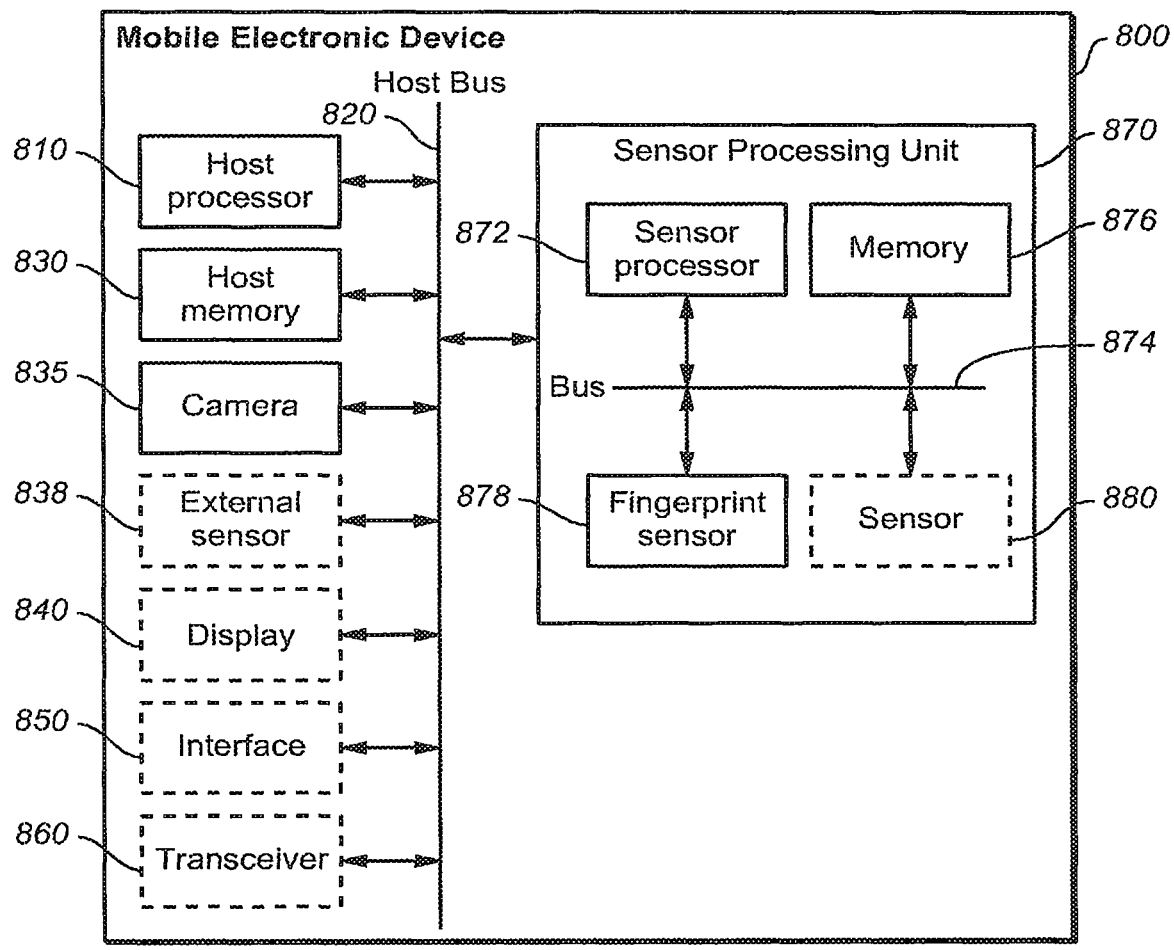
FIG. 8 shows an example architecture of a fingerprint device, according to an embodiment.

FIG. 8 shows an example architecture of an electronic device 800 including a fingerprint sensor, according to an embodiment. The architecture of electronic device 800, or a similar architecture, may represent mobile fingerprint devices, e.g., smartphones, or stationary/fixed fingerprint device, e.g., doorknobs or handles equipped with a fingerprint sensor. For example, a gaming control may be associated with one or more (handheld) gaming controllers), and each of the controllers may comprise a fingerprint sensor. Enrollment of the fingerprint of the user may be performed using the fingerprint sensor of one controller, and then the methods and procedures discussed above may be used for enrollment of the user on the fingerprint sensor in another controller.

As depicted in FIG. 8, mobile electronic device 800 may include a host processor 810, a host bus 820, a host memory 830, a camera 835, and a sensor processing unit 870. Some embodiments of mobile electronic device 800 may further include one or more of an external sensor 838, a display 840, an interface 850, a transceiver 860 (all depicted in dashed lines) and/or other components. In various embodiments, electrical power for mobile electronic device 800 is provided by a mobile power source such as a battery, when not being actively charged.

Host processor 810 can be one or more microprocessors, central processing units (CPUs), DSPs, general purpose microprocessors, ASICs, ASIPs, FPGAs or other processors which run software programs or applications, which may be stored in host memory 830, associated with the functions and capabilities of mobile electronic device 800.

Host bus 820 may be any suitable bus or interface to include, without limitation, a peripheral component interconnect express (PCIe) bus, a universal serial bus (USB), a universal asynchronous receiver/transmitter (DART) serial bus, a suitable advanced microcontroller bus architecture (AMBA) interface; an Inter-integrated Circuit (I2C) bus, a serial digital input output (SDIO) bus, a serial peripheral interface (SPI) or other equivalent. In the embodiment shown, host processor 810, host memory 830, display 840, interface 850, transceiver 860, sensor processing unit 870, and other components of mobile electronic device 800 may be coupled communicatively through host bus 820 in order to exchange commands and data. Depending on the architecture, different bus configurations may be employed as desired. For example, additional buses may be used to couple the various components of mobile electronic device 800, such as by using a dedicated bus between host processor 810 and memory 830.

Host memory 830 can be any suitable type of memory, including but not limited to electronic memory (e.g., read only memory (ROM), random access memory, or other electronic memory), hard disk, optical disk, or some combination thereof. Multiple layers of software can be stored in host memory 830 for use with/operation upon host processor 810. For example, an operating system layer can be provided for mobile electronic device 800 to control and manage system resources in real time, enable functions of application software and other layers, and interface application programs with other software and functions of mobile electronic device 800. Similarly, a user experience system layer may operate upon or be facilitated by the operating system. The user experience system may comprise one or more software application programs such as menu navigation software; games, device function control, gesture recognition, image processing or adjusting, voice recognition, navigation software, communications software (such as telephony or wireless local area network (WLAN) software), and/or any of a wide variety of other software and functional interfaces for interaction with the user can be provided. In some embodiments, multiple different applications can be provided on a single mobile electronic device 800, and in some of those embodiments, multiple applications can run simultaneously as part of the user experience system. In some embodiments, the user experience system, operating system, and/or the host processor 810 may operate in a low-power mode (e.g., a sleep mode) where very few instructions are processed. Such a low-power mode may utilize only a small fraction of the processing power of a full-power mode (e.g., an awake mode) of the host processor 810.

Camera 835 may comprise, without limitation: a camera, and infrared camera, or other type of optical sensor for capturing an image of a person, an object or a scene. It should be appreciated that mobile electronic device 800 may include more than one camera 835. In one example, external sensor 838 is a front-side optical sensor (e.g., front-side camera) and camera 835 is a back-side optical sensor (e.g., back-side camera).

Display 840, when included, may be a liquid crystal device, (organic) light emitting diode device, or other display device suitable for creating and visibly depicting graphic images and/or alphanumeric characters recognizable to a user. Display 840 may be configured to output images viewable by the user and may additionally or alternatively function as a viewfinder for camera.

Interface 850, when included, can be any of a variety of different devices providing input and/or output to a user, such as audio speakers, touch screen, real or virtual buttons, joystick, slider, knob, printer, scanner, computer network I/O device, other connected peripherals and the like.

Transceiver 860, when included, may be one or more of a wired or wireless transceiver which facilitates receipt of data at mobile electronic device 800 from an external transmission source and transmission of data from mobile electronic device 800 to an external recipient. By way of example, and not of limitation, in various embodiments, transceiver 860 comprises one or more of: a cellular transceiver, a wireless local area network transceiver (e.g., a transceiver compliant with one or more Institute of Electrical and Electronics Engineers (IEEE) 802.11 specifications for wireless local area network communication), a wireless personal area network transceiver (e.g., a transceiver compliant with one or more IEEE 802.15 specifications for wireless personal area network communication), and a wired a serial transceiver (e.g., a universal serial bus for wired communication).

Mobile electronic device 800 also includes a general purpose sensor assembly in the form of integrated sensor processing unit (SPU) 870 which includes sensor processor 872, memory 876, fingerprint sensor 878, and at least one sensor optional sensor 880, and a bus 874 for facilitating communication between these and other components of sensor processing unit 870. In some embodiments, all of the components illustrated in sensor processing unit 870 may be embodied on a single integrated circuit. It should be appreciated that sensor processing unit 870 may be manufactured as a stand-alone unit (e.g., an integrated circuit), that may exist separately from a larger electronic device. Although depicted as a portion of mobile electronic device 800, in some embodiments, sensor processing unit 870 may be incorporated in an electronic device that is not mobile.

Sensor processor 872 can be one or more microprocessors, CPUs, DSPs, general purpose microprocessors, ASICs, ASIPs, FPGAs or other processors which run software programs, which may be stored in memory 876, associated with the functions of sensor processing unit 870.

Bus 874 may be any suitable bus or interface to include, without limitation, a peripheral component interconnect express (PCIe) bus, a universal serial bus (USB), a universal asynchronous receiver/transmitter (DART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. In the embodiment shown, sensor processor 872, memory 876, fingerprint sensor 878, and other components of sensor processing unit 870 may be communicatively coupled through bus 874 in order to exchange data.

Memory 876 can be any suitable type of memory, including but not limited to electronic memory (e.g., read only memory (ROM), random access memory, or other electronic memory). Memory 876 may store algorithms or routines or other instructions for processing data received from fingerprint sensor 878 and one or more sensors 880, as well as the received data either in its raw form or after some processing. Such algorithms and routines may be implemented by sensor processor 872 and/or by logic or processing capabilities included in sensor 878.

A sensor 880 may comprise, without limitation: a temperature sensor, an atmospheric pressure sensor, an infrared sensor, an ultrasonic sensor, a radio frequency sensor, a navigation satellite system sensor (such as a global positioning system receiver), an acoustic sensor (e.g., a microphone), an inertial or motion sensor (e.g., a gyroscope, accelerometer, or magnetometer) for measuring the orientation or motion of the sensor in space, or other type of sensor for measuring other physical or environmental quantities. In some embodiments, one or more sensors 880 may be implemented using a micro-electro-mechanical system (MEMS) that is integrated with sensor processor 872 and one or more other components of SPU 870 in a single chip or package.

Figure 9:
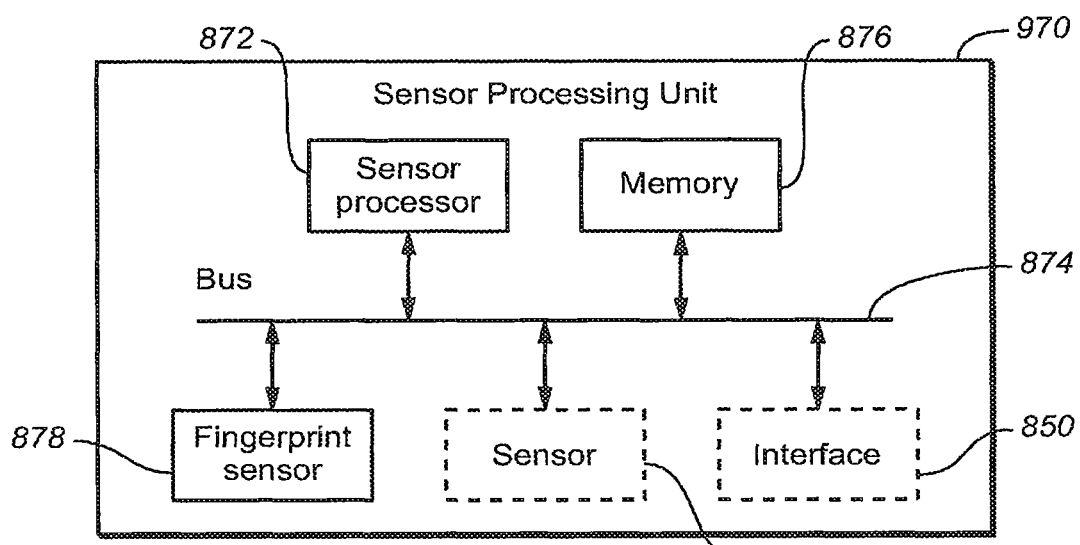
FIG. 9 shows an example sensor processing unit (SPU), according to an embodiment.

In some embodiments, the architecture may be simplified and the device will consist of an SPU, as illustrated SPU 970 of FIG. 9. In the illustrated embodiment, tasks performed by the host processor of electronic device 800 are performed by the sensor processor 872. In this case, the SPU 970 will comprise interface 850 and will handle the communication with the other device.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems and components have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components. Any components described herein may also interact with one or more other components not specifically described herein.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. A computer-implemented method for generating an estimated fingerprint image, the method comprising:
   receiving, at a processor, a ridge and valley pattern of a fingerprint of a finger, wherein the ridge and valley pattern is generated using a first sensor;
   receiving, at the processor, a sensor image comprising a partial fingerprint of the finger, wherein the sensor image is generated using a second sensor;
   extracting, at the processor, ridge and valley characteristics of the fingerprint from the sensor image comprising the partial fingerprint;
   generating, at the processor, an estimated fingerprint image based at least on the ridge and valley pattern of the fingerprint and the ridge and valley characteristics of the fingerprint; and
   storing the estimated fingerprint image for use during authentication as an authentication reference image.

2. The method of claim 1, wherein the receiving the ridge and valley pattern of the fingerprint of the finger comprises:
   receiving a camera image comprising the fingerprint of the finger; and
   extracting the ridge and valley pattern of the fingerprint from the camera image comprising the fingerprint.

3. The method of claim 2, wherein the receiving a camera image comprising a fingerprint of a finger comprises:
   acquiring the camera image comprising the fingerprint of the finger at a camera of an electronic device, wherein the camera is the first sensor.

4. The method of claim 1, the method further comprising:
   receiving a camera image comprising a plurality of fingerprints of a plurality of fingers; and
   extracting the ridge and valley pattern of the fingerprint of the finger from the camera image comprising the plurality of fingerprints.

5. The method of claim 4, further comprising:
   extracting a second ridge and valley pattern of a second fingerprint of a second finger from the camera image comprising the plurality of fingerprints.

6. The method of claim 5, further comprising:
   generating a second estimated fingerprint image based at least in part on the second ridge and valley pattern of the second fingerprint and the ridge and valley characteristics of the fingerprint.

7. The method of claim 1, wherein the ridge and valley pattern comprises a sensor-independent fingerprint pattern.

8. The method of claim 1, wherein the receiving a sensor image comprising a partial fingerprint of a finger comprises:
   acquiring the sensor image comprising the partial fingerprint of the finger at a fingerprint sensor of an electronic device, wherein the fingerprint sensor is the second sensor.

9. The method of claim 1, further comprising:
   receiving a second sensor image comprising a second partial fingerprint of the finger; and
   updating the estimated fingerprint image based on the second partial fingerprint.

10. The method of claim 1, further comprising:
    comparing a portion of the estimated fingerprint image comprising the partial fingerprint to the sensor image comprising the partial fingerprint; and
    determining a confidence in accuracy of the estimated fingerprint image based at least in part on the comparing.

11. The method of claim 10, further comprising:
provided the confidence in accuracy of the estimated fingerprint image does not satisfy a confidence threshold, determining that the estimated fingerprint image is not satisfactory for authentication.

12. The method of claim 1, wherein the receiving the ridge and valley pattern of the fingerprint of the finger comprises receiving the ridge and valley pattern from another electronic device.

13. The method of claim 12, wherein the ridge and valley pattern is comprised within a sensor-independent fingerprint reference image received from the another electronic device.

14. The method of claim 1, further comprising:
performing user authentication using the estimated fingerprint image.

15. A fingerprint device comprising:
a fingerprint sensor;
a memory; and
a sensor processing unit configured to:
receive a ridge and valley pattern of a fingerprint of a finger, wherein the ridge and valley pattern is generated using a sensor other than the fingerprint sensor;
acquire a sensor image comprising a partial fingerprint of the finger at the fingerprint sensor;
extract ridge and valley characteristics of the fingerprint from the sensor image comprising the partial fingerprint;
generate an estimated fingerprint image based at least on the ridge and valley pattern of the fingerprint and the ridge and valley characteristics of the fingerprint; and
store the estimated fingerprint image for use during authentication as an authentication reference image.

16. The fingerprint device of claim 15, wherein the ridge and valley pattern is received from an electronic device comprising the sensor and that does not comprise the fingerprint device.

17. The fingerprint device of claim 16, wherein the ridge and valley pattern is comprised within a sensor-independent fingerprint reference image received from the electronic device.

18. The fingerprint device of claim 15, wherein the sensor processing unit is further configured to:
acquire a second sensor image comprising a second partial fingerprint of the finger at the fingerprint sensor; and
update the estimated fingerprint image based on the second partial fingerprint.

19. An electronic device comprising:
a camera;
a fingerprint sensor;
a memory; and
a processor configured to:
acquire a camera image comprising a fingerprint of a finger at the camera;
extract a ridge and valley pattern of the fingerprint from the camera image comprising the fingerprint;
acquire a sensor image comprising a partial fingerprint of the finger at the fingerprint sensor;
extract ridge and valley characteristics of the fingerprint from the sensor image comprising the partial fingerprint;
generate an estimated fingerprint image based at least on the ridge and valley pattern of the fingerprint and the ridge and valley characteristics of the fingerprint; and
store the estimated fingerprint image in the memory for use during authentication as an authentication reference image.

20. The electronic device of claim 19, wherein the processor is further configured to:
acquire a second sensor image comprising a second partial fingerprint of the finger at the fingerprint sensor; and
update the estimated fingerprint image based on the second partial fingerprint.

\* \* \* \* \*